United States Patent
Ishikawa et al.

(10) Patent No.: US 12,424,351 B2
(45) Date of Patent: Sep. 23, 2025

(54) ANTENNA CABLE NOISE SUPPRESSION STRUCTURE

(71) Applicant: Yazaki Corporation, Tokyo (JP)

(72) Inventors: Tatsuya Ishikawa, Shizuoka (JP); Tohru Aoki, Shizuoka (JP); Katsuya Fujihira, Shizuoka (JP); Kazuhiko Tsuchiya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 202 days.

(21) Appl. No.: 18/368,388

(22) Filed: Sep. 14, 2023

(65) Prior Publication Data

US 2024/0006096 A1    Jan. 4, 2024

Related U.S. Application Data

(63) Continuation of application No. PCT/JP2022/038849, filed on Oct. 19, 2022.

(30) Foreign Application Priority Data

Nov. 16, 2021 (JP) .................................. 2021-186414

(51) Int. Cl.
*H01B 11/00* (2006.01)
*H01B 11/18* (2006.01)
*H01P 3/06* (2006.01)

(52) U.S. Cl.
CPC ............ *H01B 11/1895* (2013.01); *H01P 3/06* (2013.01)

(58) Field of Classification Search
CPC .............................. H01B 11/1895; H01P 3/06
See application file for complete search history.

(56) References Cited

U.S. PATENT DOCUMENTS

| | | | |
|---|---|---|---|
| 2006/0022775 A1* | 2/2006 | Greeley | H01P 3/06 333/246 |
| 2020/0328491 A1* | 10/2020 | Hirota | H01P 5/08 |
| 2020/0395717 A1 | 12/2020 | Kim et al. | |
| 2021/0242641 A1* | 8/2021 | Ikuma | H01R 13/6474 |

FOREIGN PATENT DOCUMENTS

| | | |
|---|---|---|
| JP | 2004-103329 A | 4/2004 |
| JP | 2004-349127 A | 12/2004 |
| JP | 2009-303201 A | 12/2009 |
| JP | 2020-205256 A | 12/2020 |

OTHER PUBLICATIONS

International Search Report for PCT/JP2022/038849 dated Dec. 20, 2022.
Written Opinion for PCT/JP2022/038849 dated Dec. 20, 2022.

* cited by examiner

*Primary Examiner* — Pete T Lee
(74) *Attorney, Agent, or Firm* — Sughrue Mion, PLLC

(57) ABSTRACT

An antenna cable noise suppression structure includes a plurality of antenna cables and a noise suppression member that has electrical conductivity and is electrically connected to each of outer conductors of two or more antenna cables. Further, the noise suppression member is electrically connected to an outer conductor of each antenna cable at a position at which a distance from an end of each antenna cable is equal to or less than one quarter of a wavelength calculated based on a frequency of a signal transmitted by each antenna cable. Further, the noise suppression member and the outer conductor that is electrically connected to the noise suppression member are grounded to a grounded portion.

6 Claims, 13 Drawing Sheets

ANTENNA CABLE NOISE SUPPRESSION STRUCTURE

CROSS-REFERENCE TO RELATED APPLICATIONS

The present application is a continuation of International Application No. PCT/JP2022/038849, filed on Oct. 19, 2022, and based upon and claims the benefit of priority from Japanese Patent Application No. 2021-186414, filed on Nov. 16, 2021, the entire contents of which are incorporated herein by reference.

TECHNICAL FIELD

The present application relates to an antenna cable noise suppression structure.

BACKGROUND

In Japanese Unexamined Patent Application Publication No. 2004-103329, a coaxial cable is used as an antenna cable. Further, in an electric wire bundle forming a wire harness, a circuit being a noise source and a circuit not being a noise source are separated from each other, and the circuit not being a noise source is arranged between the circuit being a noise source and the antenna cable. In this manner, a distance between the circuit being a noise source and the antenna cable is increased, and intrusion of a signal and a noise that pass through the circuit being a noise source can be suppressed.

SUMMARY OF THE INVENTION

Incidentally, in recent years, techniques such as diversity reception using a plurality of antennas and an antenna unit of a multi-media composite type have been proposed. Further, such techniques use a plurality of antenna cables.

When a plurality of antenna cables are used as described above, it is preferred that generation of a noise in each antenna cable be suppressed with a minimal effort.

An object of the present application is to provide an antenna cable noise suppression structure capable of suppressing generation of a noise in each antenna cable more easily and securely even when a plurality of antenna cables are used.

An antenna cable noise suppression structure according to the present application includes a plurality of antenna cables and a noise suppression member having electrical conductivity and being electrically connected to each of outer conductors of two or more antenna cables, wherein the noise suppression member is electrically connected to an outer conductor of each antenna cable at a position at which a distance from an end portion of each antenna cable is equal to or less than one quarter of a wavelength calculated based on a frequency of a signal transmitted by each antenna cable, and the noise suppression member and the outer conductor that is electrically connected to the noise suppression member are grounded to a grounded portion.

According to the present application, it is possible to provide an antenna cable noise suppression structure capable of suppressing generation of a noise in each antenna cable more easily and securely even when a plurality of antenna cables are used.

DETAILED DESCRIPTION OF THE INVENTION

With reference to the drawings, an antenna cable noise suppression structure according to this embodiment is described below in detail.

Description is given below while defining a vertical direction of the antenna cable noise suppression structure under a state in which a GND plate (grounded portion) is positioned on the lower side and an antenna cable is positioned on the upper side.

Further, similar constituent elements are included in a plurality of embodiments and modification examples thereof

First Embodiment

Figure 1:
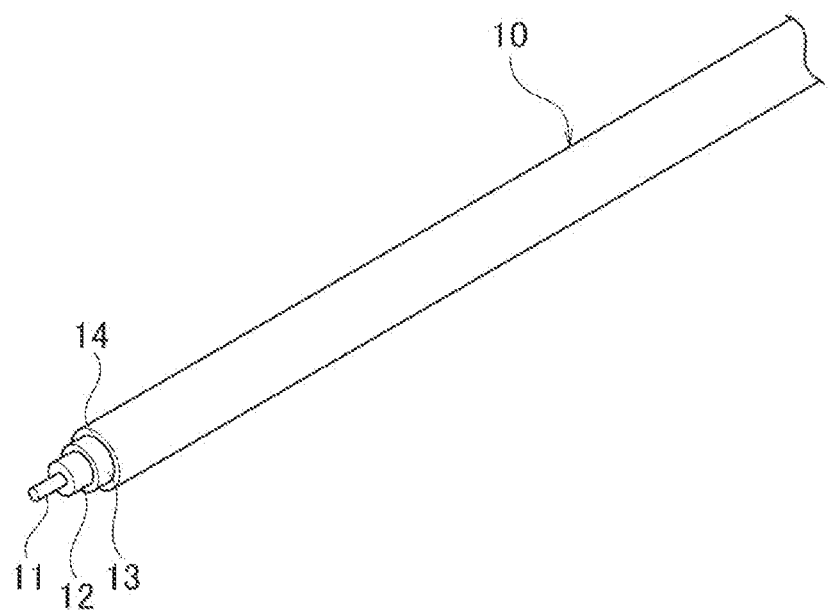
FIG. 1 is a perspective view illustrating an example of an antenna cable according to a first embodiment.

In an antenna cable noise suppression structure 1 according to the present embodiment, an antenna cable 10 as illustrated in FIG. 1 is used.

The antenna cable 10 is a coaxial cable, and includes an inner conductor 11 being a core wire arranged at the center portion and an inner insulation layer 12 being a dielectric provided to a periphery of the inner conductor 11, as illustrated in FIG. 1. Further, the antenna cable 10 includes an outer conductor 13 being a shielding layer provided to a periphery of the inner insulation layer 12 and an outer insulation layer 14 provided to a periphery of the outer conductor 13. The outer insulation layer 14 includes a function as a protection layer for protecting the outer conductor 13.

Further, the antenna cable noise suppression structure 1 according to the present embodiment includes a plurality of antenna cables 10. In the present embodiment, the antenna cable noise suppression structure 1 including four antenna cables 10 is illustrated.

Moreover, the antenna cable noise suppression structure 1 includes a noise suppression member 20 capable of suppressing a noise generated in the four (a plurality of: two or more) antenna cables 10. For example, the noise suppression member 20 is formed of a single metal foil or one braided wire, and has electrical conductivity.

Figure 2:
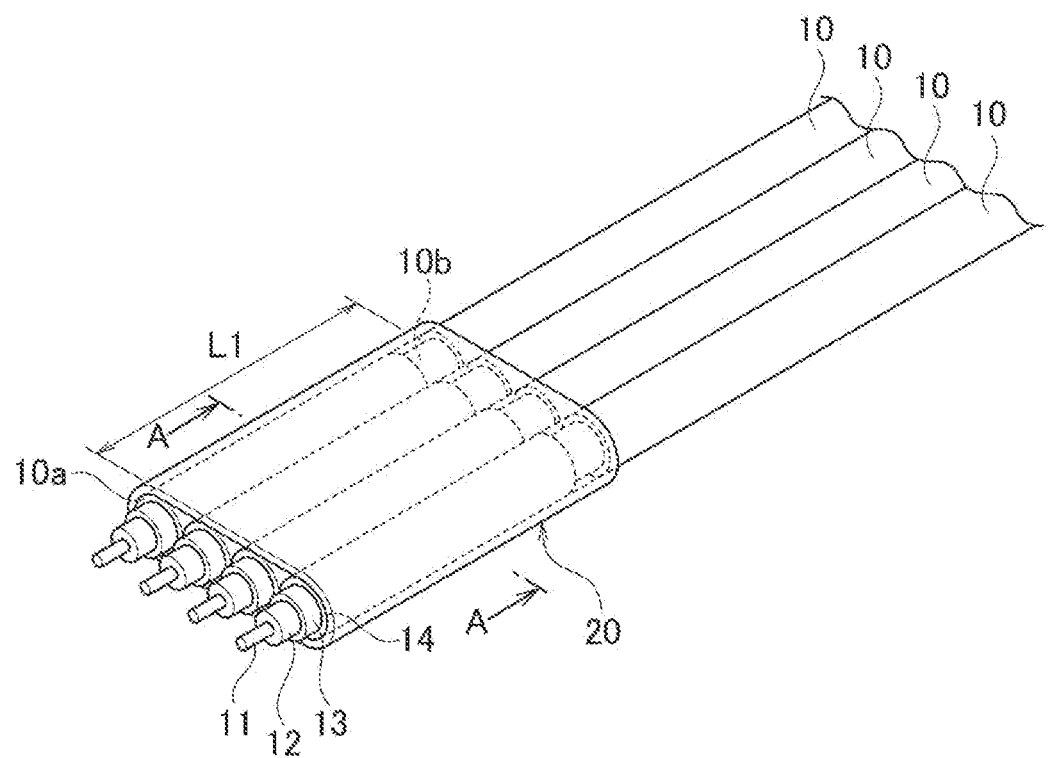
FIG. 2 is a perspective view illustrating a state in which a plurality of antenna cables are bundled by using an example of a noise suppression member according to the first embodiment.
Figure 3:
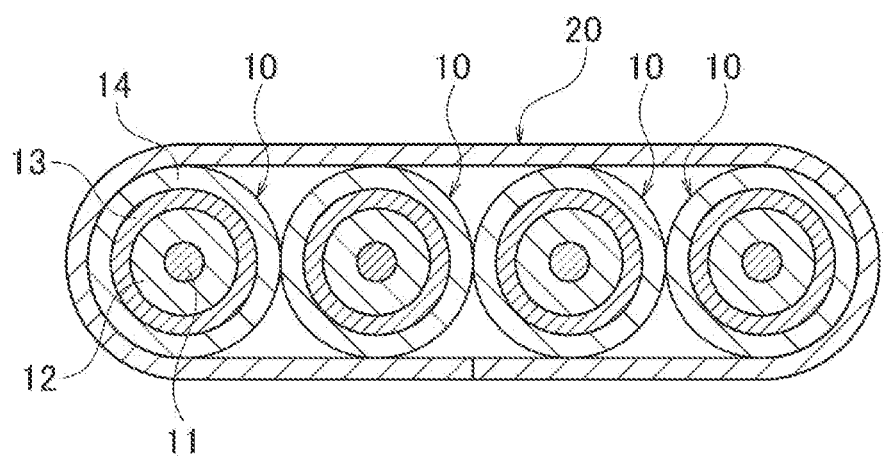
FIG. 3 is a cross-sectional view taken along the line A-A in FIG. 2, illustrating a state in which the plurality of antenna cables are bundled by using an example of the noise suppression member according to the first embodiment.

Further, as illustrated in FIG. 2 and FIG. 3, the four (a plurality of: two or more) antenna cables 10 are bundled by the one noise suppression member 20. Specifically, the four antenna cables 10 are arrayed in one row along a width direction (a direction intersecting with a cable axis direction) while aligning positions of end portions 10a on a side connected to an antenna, which is omitted in illustration. Further, in this state, the noise suppression member 20 is wound around the entire circumference from the end portion 10a to a position away from the end portion 10a along the cable axis direction by a predetermined distance, and thus the four antenna cables 10 is bundled by the one noise suppression member 20.

As described above, in the present embodiment, all the antenna cables 10 included in the antenna cable noise suppression structure 1 are collectively bundled by the one noise suppression member 20.

Note that various antennas may be used as the antenna to which each of the antenna cables 10 is connected. The antenna may be freely selected from publicly-known antennas such as a broadcasting reception antenna, a telephone communication antenna, a GPS reception antenna installed in a vehicle or the like, a VICS (registered trademark) reception antenna, and an ETC communication antenna, according to an intended use. In the present embodiment, each of the four antenna cables 10 is connected to the antenna used in substantially the same frequency band.

Further, under a state in which the four antenna cables 10 are bundled, the noise suppression member 20 is electrically connected to all the outer conductors 13 that are provided to the four antenna cables 10, respectively.

In the present embodiment, the outer insulation layer 14 corresponding to a predetermined portion of each of the antenna cables 10 is removed in advance, and the outer conductor 13 is exposed in this portion. Further, the noise suppression member 20 is brought into contact with the outer conductor 13 that is exposed, and thus is electrically connected to the outer conductors 13 of the four antenna cables 10. As described above, in the present embodiment, the portion in which the outer conductor 13 is exposed in each of the antenna cables 10 functions as a contact portion 10b with respect to the noise suppression member 20, and the contact portion 10b is formed at a portion away from the end portion 10a along the cable axis direction by a distance L1. In this state, the portions from the end portions 10a to the contact portions 10b of the four antenna cables 10 are covered with the noise suppression member 20.

Figure 4:
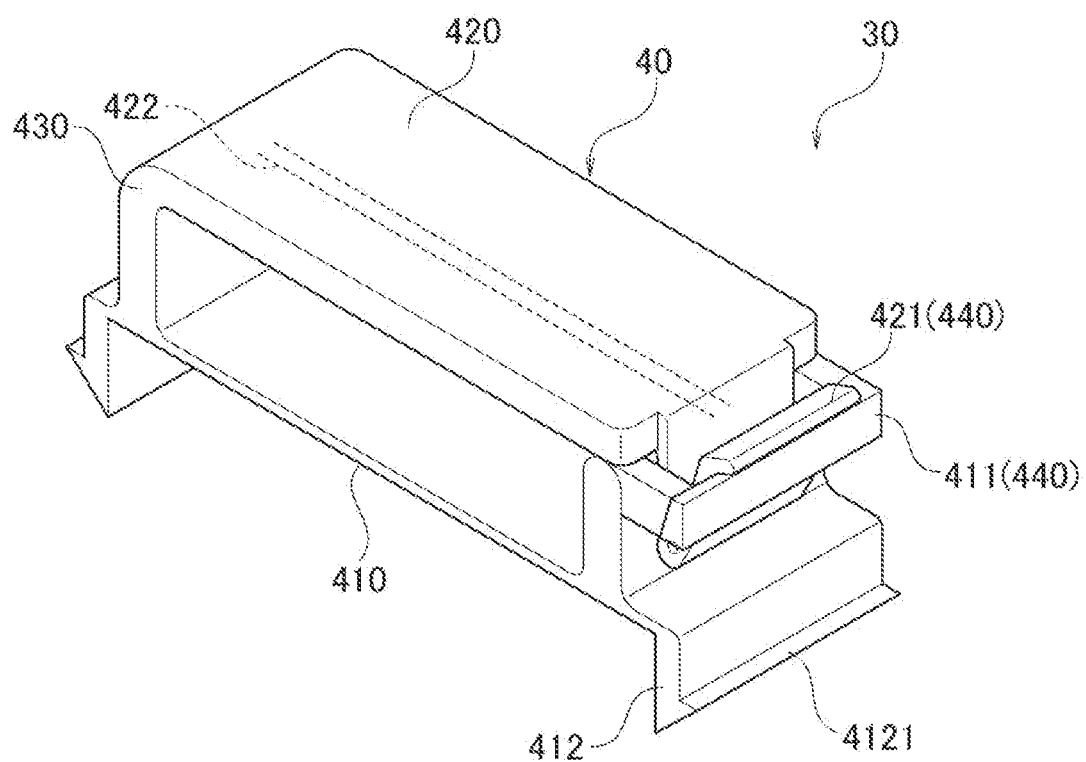
FIG. 4 is a perspective view illustrating an example of a clamping member according to the first embodiment.

Electrical conduction between the noise suppression member 20 and the outer conductors 13 of the four antenna cables 10 may be achieved by using a clamping member 30 as illustrated in FIG. 4, for example.

The clamping member 30 being one member is capable of simultaneously clamping the plurality of antenna cables 10 that are independent from each other. In the present embodiment, the clamping member 30 clamps the four antenna cables 10, and thus the noise suppression member 20 is brought into contact with the outer conductors 13 of the four antenna cables 10.

In the present embodiment, the clamping member 30 includes a clamping main body 40 capable of clamping the plurality of antenna cables 10 that are arrayed in the width direction. The clamping main body 40 may be formed by using a material such as a synthetic resin.

The clamping main body 40 includes a first clamping portion 410 and a second clamping portion 420, and the four antenna cables 10 is clamped between the first clamping portion 410 and the second clamping portion 420.

Here, in the present embodiment, the first clamping portion 410 and the second clamping portion 420 are coupled to each other via a hinge that is formed on one end side in the width direction, and the second clamping portion 420 is turnable relatively to the first clamping portion 410 with the hinge 430 as a base point. In other words, the second clamping portion 420 is configured to be turnable relatively to the first clamping portion 410 between an opened state in which the four antenna cables 10 are not clamped and a closed state in which the four antenna cables 10 are clamped.

Further, on the other end side of the first clamping portion 410 and the second clamping portion 420 in the width direction, a lock portion 440 capable of performing a lock in the closed state is formed. In other words, on the other end side of the first clamping portion 410 and the second clamping portion 420 in the width direction, the lock portion 440 capable of maintaining the state in which the four antenna cables 10 are clamped is formed.

In the present embodiment, the lock portion 440 includes an engaging portion 421 and an engaged portion 411. The engaging portion 421 is formed on the other end side of the second clamping portion 420 in the width direction. The engaged portion 411 is formed on the other end side of the first clamping portion 410 in the width direction, and is releasably engaged with the engaging portion 421.

Specifically, the engaging portion 421 includes an extension wall 4211 that is provided to extend downward (toward the first clamping portion 410) and an arm portion 4212 that is provided to extend upward from the lower end of the extension wall 4211 and outward in the width direction. The arm portion 4212 is elastically deformable in the width direction while a coupling portion with the extension wall 4211 functions as a base point. Moreover, the engaging portion 421 includes a hook portion 4213 that is formed at the center portion of the arm portion 4212 in the vertical direction to protrude outward in the width direction and is engaged with the engaged portion 411.

Meanwhile, the engaged portion 411 includes an extension wall 4111 that is provided to extend upward (toward the second clamping portion 420) and an engagement frame 4112 that is continuously provided outward in the width direction at the upper end of the extension wall 4111. The hook portion 4213 is releasably hung on the engagement frame 4112.

Further, a cable retainer 422 is formed at the lower end of the second clamping portion 420 at a position corresponding to the contact portion 10b of each of the antenna cables 10. The cable retainer 422 performs pressing by pressing down and bringing the noise suppression member 20 into contact with the outer conductor 13 at the time of clamping the four antenna cables 10 by the clamping main body 40.

Further, the clamping member 30 includes a grounding portion 62 that is grounded to a GND plate (grounded portion) 70 under a state in which the grounding portion 62 is electrically connected to the noise suppression member 20 and the outer conductors 13 of the four antenna cables 10.

Here, in the present embodiment, the grounding portion 62 is formed on a grounding jumper 60 formed of a material having electrical conductivity such as metal. Further, the grounding jumper 60 is fixed to the first clamping portion 410, and thus the grounding portion 62 is fixed to the first clamping portion 410.

Specifically, the grounding jumper 60 includes a main body portion 61 that extends elongatedly in the width direction and is exposed upward and a pair of grounding portions 62 that are formed on both ends in the width direction of the lower end of the main body portion 61. The main body portion 61 is provided at the upper end of the first clamping portion 410 at a position corresponding to the contact portion 10b of each of the antenna cables 10. Further, when the clamping main body 40 clamps the four antenna cables 10, the upper end of the main body portion 61 is brought into contact with the noise suppression member 20 that is brought into contact with the contact portion 10b of each of the antenna cables 10.

In this manner, the noise suppression member 20 and the outer conductors 13 of the four antenna cables 10 are electrically connected to the grounding portion 62 via the main body portion 61.

Note that, in the present embodiment, the grounding jumper 60 is fixed to the first clamping portion 410 under a state in which the grounding portions 62 are exposed downward. Such a configuration may be formed by insert molding, for example.

Figure 6:
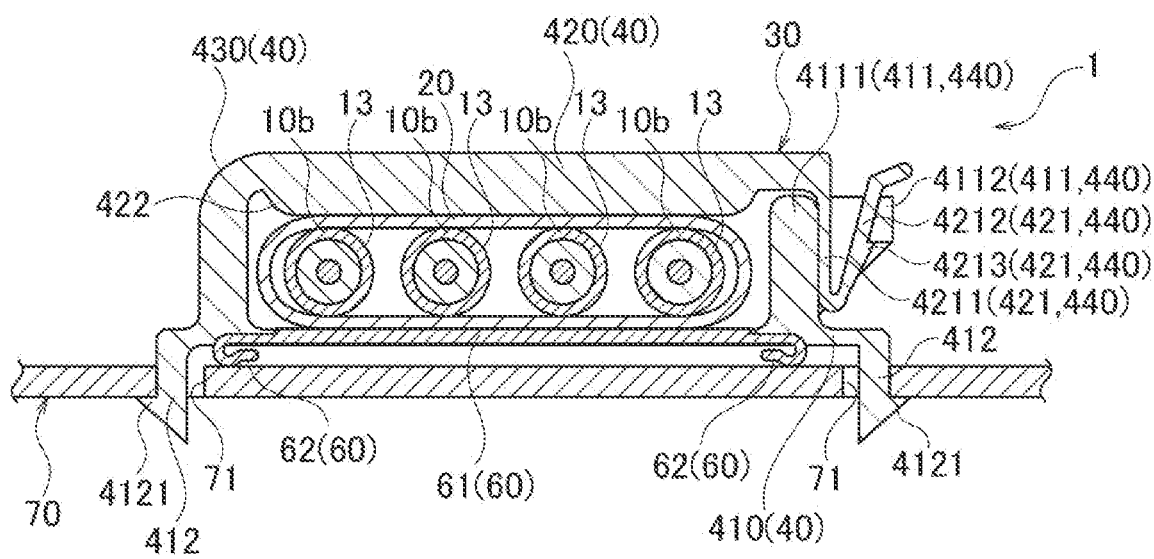
FIG. 6 is a cross-sectional view taken along the line B-B in FIG. 5, illustrating an example of the antenna cable noise suppression structure according to the first embodiment.

Further, as illustrated in FIG. 6, the grounding portions 62 that are exposed downward are brought into contact with the GND plate (grounded portion) 70, and thus the outer conductors 13 of all the antenna cables 10 clamped by the clamping main body 40 are grounded to the GND plate (grounded portion) 70. In this state, the noise suppression member 20 is also grounded to the GND plate (grounded portion) 70.

In the present embodiment, a fixing portion 412 is formed to protrude downward on each side in the width direction of the lower end of the first clamping portion 410, and a hook portion 4121 that protrudes outward in the width direction is formed at the lower end of the fixing portion 412. Further, the fixing portion 412 is inserted into an engagement hole 71 from above, which is formed in the GND plate (grounded portion) 70, and thus the hook portion 4121 is hung on the lower surface of the GND plate (grounded portion) 70. In this manner, the clamping member 30 that clamps the plurality of antenna cables 10 is fixed to the GND plate (grounded portion) 70. In this state, the grounding portions 62 are brought into contact with the upper side of the GND plate (grounded portion) 70. In this manner, the clamping member 30 that clamps the four antenna cables 10 is fixed to the GND plate 70, and thus the outer conductors 13 of all the antenna cables 10 clamped by the clamping main body 40 and the noise suppression member 20 are grounded to the GND plate 70.

The antenna cable noise suppression structure 1 using the clamping member 30 thus configured may be formed by the following method, for example.

First, the second clamping portion 420 turns relatively to the first clamping portion 410 in an opening direction, and thus the opened state is obtained. Subsequently, the four (plurality of) antenna cables 10 are arranged between the second clamping portion 420 and the first clamping portion 410. In this state, the four (plurality of) antenna cables 10 are arranged between the second clamping portion 420 and the first clamping portion 410 while the contact portions 10b covered with the noise suppression member 20 face the cable retainer 422 and the main body portion 61 of the grounding jumper 60.

Further, under a state in which the four antenna cables 10 are arranged between the second clamping portion 420 and the first clamping portion 410, the second clamping portion 420 turns relatively to the first clamping portion 410 in a closing direction, and the engaging portion 421 is engaged and locked with the engaged portion 411. In this state, the noise suppression member 20 is pressed downward by the cable retainer 422 and is pressed upward by the main body portion 61, and thus the outer conductors 13 of all the antenna cables 10 and the noise suppression member 20 are brought into contact with each other. Further, there is obtained a state in which the outer conductors 13 of all the antenna cables 10 and the noise suppression member 20 are electrically connected to the grounding portion 62 via the main body portion 61.

Further, the clamping member 30 is fixed to the GND plate (grounded portion) 70, and thus all the outer conductors 13 of the four (plurality of) antenna cables 10 and the noise suppression member 20 are grounded to the GND plate (grounded portion) 70.

In this manner, when the clamping member 30 according to the present embodiment is used, the outer conductors 13 of the plurality of antenna cables 10 and the noise suppression member 20 can be grounded to the GND plate (grounded portion) 70 more easily.

In this manner, there is formed the antenna cable noise suppression structure 1 in which all the outer conductors 13 of the four (plurality of) antenna cables 10 are electrically connected to the noise suppression member 20 at the position corresponding to the distance L1. Moreover, the antenna cable noise suppression structure 1 according to the present embodiment, all the outer conductors 13 of the four (plurality of) antenna cables 10 and the noise suppression member 20 are grounded to the GND plate (grounded portion) 70 via the grounding portions 62 at the position corresponding to the distance L1.

Here, in the present embodiment, even when a plurality of antenna cables are used, generation of a noise in each antenna cable can be suppressed with a minimal effort.

Specifically, the noise suppression member 20 is electrically connected to the outer conductor 13 of each of the antenna cables 10 at a position at which the distance L1 from the end portion 10 of each of the antenna cables is equal to or less than one quarter of a wavelength λ in each of the antenna cables 10. The wavelength λ is calculated based on a frequency f of a signal transmitted by each of the antenna cables 10, and may be obtained by λ=c/f where c is an optical speed being a signal speed.

Further, the distance L1 from the end portion 10a to the contact portion 10b in each of the antenna cables may be set by using the following expression, for example.

$$L1 = \lambda/4 \times (\varepsilon)^{-1/2}$$

Note that ε is a specific dielectric constant of the outer insulation layer 14 covered with the noise suppression member 20. As described above, in the present embodiment, the distance L1 from the end portion 10a to the contact portion 10b in each of the antenna cables is set in consideration of a wavelength shortening rate due to a dielectric of the outer insulation layer 14. Note that the wavelength shortening rate can be obtained by $K=(\varepsilon)^{-1/2}$ where K is a wavelength shortening rate.

For example, when a reception target frequency f of an implemented antenna is 800 MHz, the calculation yields λ/4=c/4f≈0.094 m. Further, when the outer insulation layer 14 is formed by using crosslinked polyethylene having a specific dielectric constant ε of 2.3, the calculation yields $L1=\lambda/4\times(\varepsilon)^{-1/2}\approx 0.062$ m.

Therefore, when each of the four antenna cables 10 is connected to an antenna having the reception target frequency f of 800 MHz, the contact portion 10b may be formed at the position away from the end portion 10a by 0.062 m.

In this manner, the antenna cable noise suppression structure 1 according to the present embodiment, the noise suppression member 20 is electrically connected to the outer conductors 13 at the position at which the distance from the end portions of the two or more antenna cables is equal to or less than one quarter of the wavelength λ. In this manner, generation of a noise in a plurality of antenna cables can be suppressed simultaneously by the one noise suppression member 20.

Note that, even when conditions such as a reception target antenna frequency and a material (dielectric) of the outer insulation layer to be used are changed, the distance L1 may be set by the calculation similar to that in the example given above.

In this manner, the antenna cable noise suppression structure 1 according to the present embodiment, all the outer conductors 13 of the four (plurality of) antenna cables 10 are electrically connected to the noise suppression member 20 at the position equal to or less than λ/4 of a noise frequency to be suppressed. Moreover, all the outer conductors 13 of the four (plurality of) antenna cables 10 and the noise suppression member 20 are grounded to the GND plate (grounded portion) 70 via the grounding portions 62 at the position equal to or less than λ/4 of a noise frequency to be suppressed.

In this manner, radiation of a noise can be suppressed (reduced), and thus generation of a noise can be suppressed more effectively.

Further, the ground potential of the outer conductor 13 that is electrically connected to the noise suppression member 20 can be stabilized more, and generation of a noise in each antenna cable can be suppressed more securely.

Figure 5:
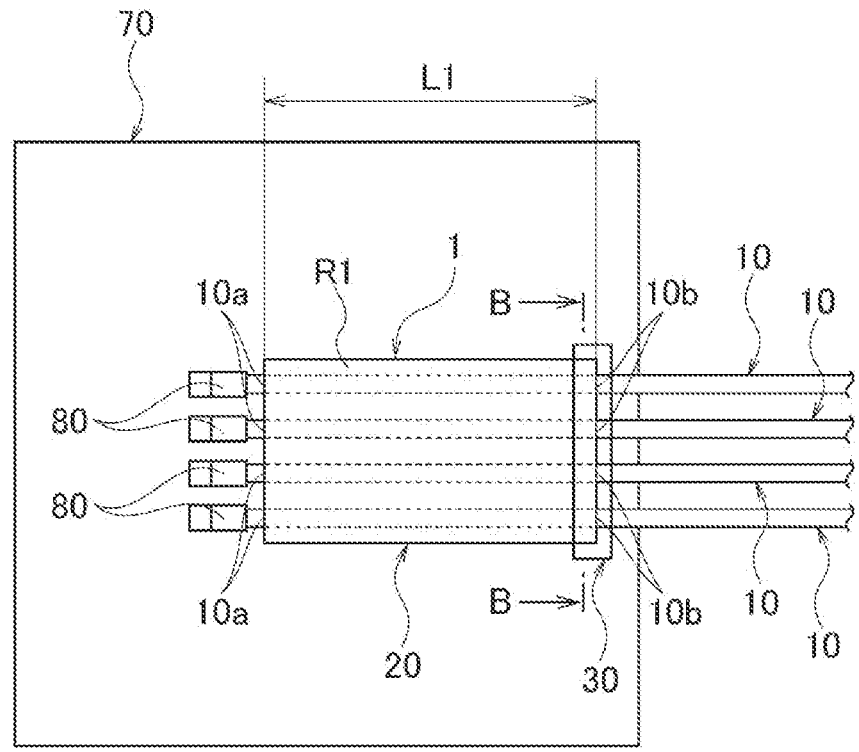
FIG. 5 is a plan view illustrating an example of an antenna cable noise suppression structure according to the first embodiment.

Further, the antenna cable noise suppression structure 1 that is formed by the above-mentioned method is arranged on the GND plate (grounded portion) 70 by connecting the end portion 10a of each of the antenna cables 10 to a coaxial connector 80 as illustrated in FIG. 5. An antenna, which is omitted in illustration is connected to each of the coaxial connectors 80.

In this state, the four antenna cables 10 are arranged so that the portions from the end portions 10a to the contact portions 10b (the outer conductors 13 that are brought into contact with the noise suppression member 20) are positioned on an inner side of a region R1 defining the noise suppression member 20 in a plane view. Note that, in the present embodiment, a view along a direction intersecting with the cable axis direction and the width direction (the vertical direction) indicates a plane view.

Further, in the present embodiment, as described above, the four antenna cables 10 are respectively connected to the antennas that are used in substantially the same frequency band. Thus, the distance L1 that is calculated is substantially the same. Therefore, under a state in which the four antenna cables 10 are arranged linearly, the portions from the end portions 10a to the contact portions 10b can be positioned on the inner side of the region R1.

Second Embodiment

An antenna cable noise suppression structure 1 according to the present embodiment is basically configured substantially the same as the antenna cable noise suppression structure 1 illustrated in the first embodiment described above.

Figure 7:
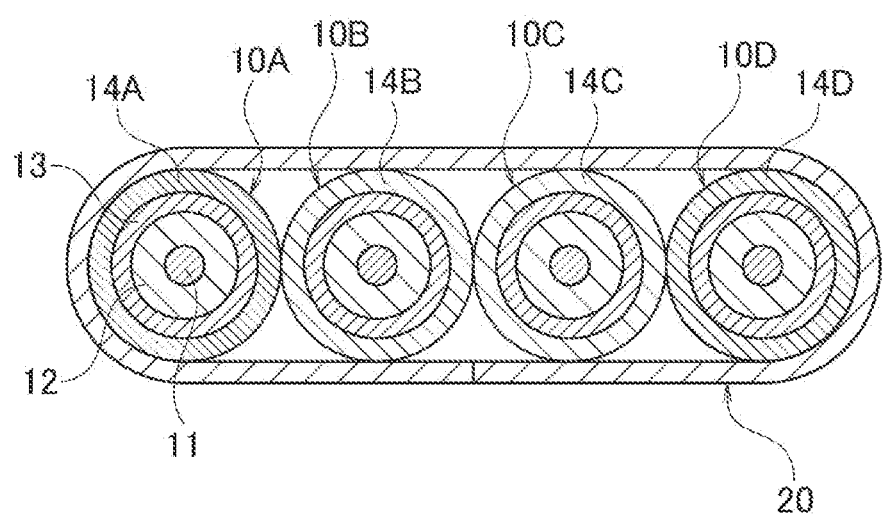
FIG. 7 is a cross-sectional view taken along the line A-A in FIG. 2, illustrating a state in which the plurality of antenna cables are bundled by using an example of a noise suppression member according to a second embodiment.

Specifically, as illustrated in FIG. 7, the antenna cable noise suppression structure 1 according to the present embodiment also includes four (plurality of) antenna cables. Further, the antenna cable noise suppression structure 1 includes the noise suppression member 20 that has electrical conductivity and are electrically connected to each of the outer conductors 13 of the four (two or more) antenna cables.

Further, the noise suppression member 20 is electrically connected to the outer conductor 13 of each of the antenna cables at the position at which the distance L1 from the end of each of the antenna cables is equal to or less than one quarter of the wavelength λ in each of the antenna cables.

Further, in the present embodiment, the noise suppression member 20 and the outer conductor 13 that is electrically connected to the noise suppression member 20 are also grounded to the GND plate (grounded portion) 70.

Specifically, in the antenna cable noise suppression structure 1 according to the present embodiment, all the outer conductors 13 of the four (plurality of) antenna cables are also electrically connected to the noise suppression member 20 at the position equal to or less than λ/4 of a noise frequency to be suppressed. Moreover, all the outer conductors 13 of the four (plurality of) antenna cables and the noise suppression member 20 are grounded to the GND plate (grounded portion) 70 via the grounding portions 62 at the position equal to or less than λ/4 of a noise frequency to be suppressed.

Here, in the present embodiment, antenna cables to be connected to antennas in different frequency bands are included. Specifically, frequency bands of antennas to be connected to all the antenna cables are different from each other.

In other words, in the present embodiment, four antenna cables 10A, 10B, 10C, and 10D are used.

Further, specific dielectric constants ε of outer insulation layer 14A, 14B, 14C, and 14D of the antenna cables 10A, 10B, 10C, and 10D including the outer conductors 13 that are electrically connected to the noise suppression member 20 are different from each other. In this state, the specific dielectric constants ε of the outer insulation layer 14A, 14B, 14C, and 14D are different from each other according to the frequency f of the signal transmitted by each of the antenna cables 10A, 10B, 10C, and 10D.

In this manner, the distance L1 from the end portions 10a to the contact portions 10b in the four antenna cables 10A, 10B, 10C, and 10D is substantially the same length.

Specifically, the distance L1 is substantially the same length by the following method. First, one antenna cable is selected from the four antenna cables 10A, 10B, 10C, and 10D as a reference. Further, the distance L1 of the reference antenna cable is calculated by using the expression shown in the first embodiment described above. Subsequently, the calculated distance L1 and frequencies of the other antenna cables are substituted in the expression shown in the first embodiment described above, and the specific dielectric constants ε of the outer insulation layers of the other antenna cables are calculated.

Further, the outer insulation layer of each of the antenna cables is formed by using the material having the specific dielectric constant δ being calculated.

With this, the distance L1 from the end portions 10a to the contact portions 10b in the four antenna cables 10A, 10B, 10C, and 10D can be substantially the same length.

In this manner, even when antenna cables with different frequencies f of signals to be transmitted are present, electrical conduction with the outer conductors 13 of the plurality of antenna cables 10A to 10D can be achieved by using the one noise suppression member 20 with a simpler configuration.

As described above, in the present embodiment, the specific dielectric constants of the insulation layers are changed. With this, in a case in which different noises are generated in a plurality of antenna cables, even when the plurality of antenna cables are grounded at the same position, a noise suppression effect can be exerted for each noise.

Note that, in the present embodiment, under a state in which the four antenna cables 10A to 10D are arranged linearly, the portions from the end portions 10a to the contact portions 10b can also be positioned on the inner side of the region R1 defining the noise suppression member 20 in a plan view.

Third Embodiment

An antenna cable noise suppression structure 1 according to the present embodiment is basically configured substantially the same as the antenna cable noise suppression structure 1 illustrated in the first embodiment described above.

Figure 8:
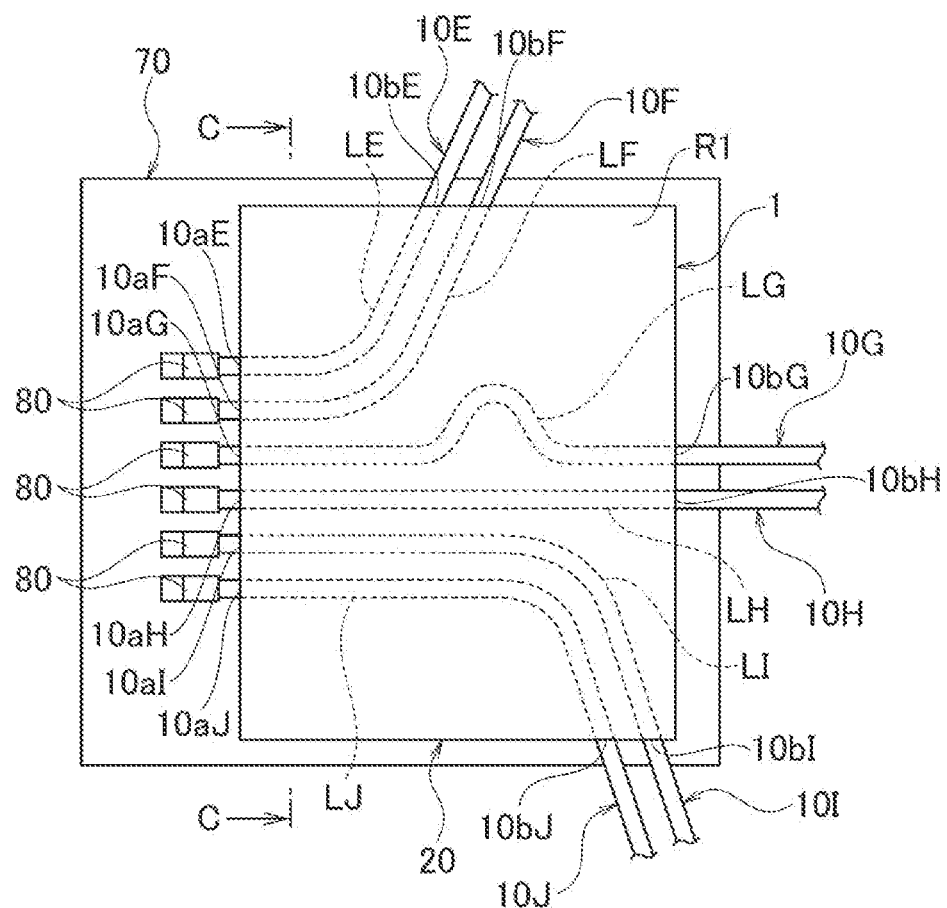
FIG. 8 is a plan view illustrating an example of an antenna cable noise suppression structure according to a third embodiment.
Figure 9:
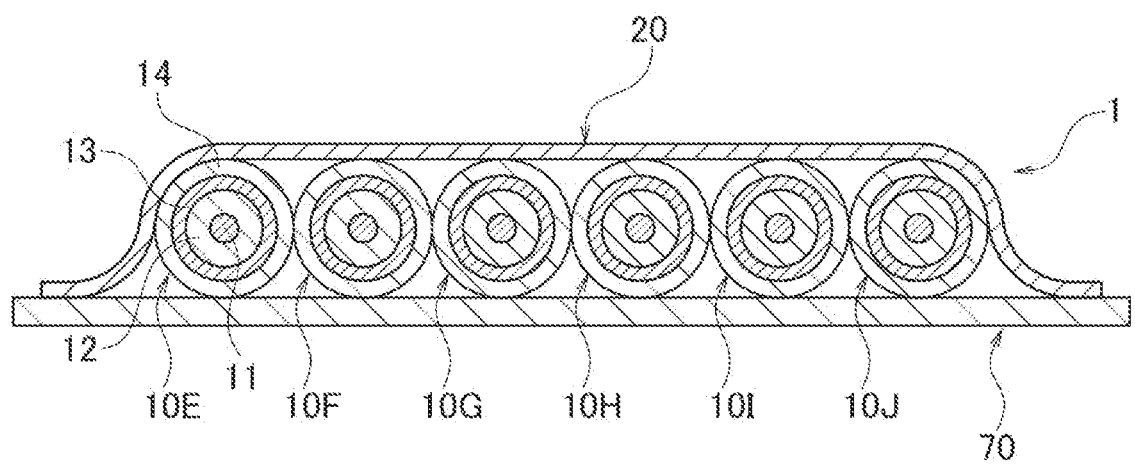
FIG. 9 is a cross-sectional view taken along the line C-C in FIG. 8, illustrating an example of the antenna cable noise suppression structure according to the third embodiment.

Specifically, as illustrated in FIG. 8 and FIG. 9, the antenna cable noise suppression structure 1 according to the present embodiment also includes a plurality of antenna cables. In the present embodiment, six antenna cables are used.

Further, the antenna cable noise suppression structure 1 includes the noise suppression member 20 that has electrical conductivity and is electrically connected to each of the outer conductors 13 of the six (two or more) antenna cables.

Further, the noise suppression member 20 is electrically connected to the outer conductor 13 of each of the antenna cables at the position at which the distance L1 from the end of each of the antenna cables is equal to or less than one quarter of the wavelength λ in each of the antenna cables.

Further, in the present embodiment, the noise suppression member 20 and the outer conductor 13 that is electrically connected to the noise suppression member 20 are also grounded to the GND plate (grounded portion) 70.

Specifically, in the antenna cable noise suppression structure 1 according to the present embodiment, all the outer conductors 13 of the six (plurality of) antenna cables are also electrically connected to the noise suppression member 20 at the position equal to or less than λ/4 of a noise frequency to be suppressed. Moreover, all the outer conductors 13 of the six (plurality of) antenna cables and the noise suppression member 20 are grounded to the GND plate (grounded portion) 70 at the position equal to or less than λ/4 of a noise frequency to be suppressed. Note that electrical conduction between the outer conductor 13 and the noise suppression member 20 and grounding of the outer conductor 13 and the noise suppression member 20 to the GND plate (grounded portion) 70 can be achieved by soldering or welding, for example.

Here, in the present embodiment, antenna cables to be connected to antennas in different frequency bands are included. Specifically, frequency bands of antennas to be connected to all the antenna cables are different from each other.

In other words, in the present embodiment, six antenna cables 10E, 10F, 10G, 10H, 10I, and 10J are used. Note that, in the present embodiment, the outer insulation layer 14 of each of the antenna cables is formed by using the same material, and has the same specific dielectric constant.

Thus, the six antenna cables have different distances from end portions to contact portions. Specifically, a distance from an end portion 10aE to a contact portion 10bE in the antenna cable 10E is a distance LE, and a distance from an end portion 10aF to a contact portion 10bF in the antenna cable 10F is a distance LF. Further, a distance from an end portion 10aG to a contact portion 10bG in the antenna cable 10G is a distance LG, and a distance from an end portion 10aH to a contact portion 10bH in the antenna cable 10H is a distance LH. Further, a distance from an end portion 10aI to a contact portion 10bI in the antenna cable 10I is a distance LI, and a distance from an end portion 10aJ to a contact portion 10bJ in the antenna cable 10J is a distance LJ.

Further, the six antenna cables are also arranged so that the portions from the end portions to the contact portions (the outer conductors 13 that are brought into contact with the noise suppression member 20) are positioned on the inner side of the region R1 defining the noise suppression member 20 in a plane view.

Here, in the present embodiment, as described above, the six antenna cables have the different distances from the end portions to the contact portions. Thus, In the present embodiment, the antenna cables that are arranged in a curved state are present so that the ranges from the end portions 10aE to 10aJ to the contact portions 10bE to 10bJ in all the antenna cables 10E to 10J are positioned on the inner side of the region R1.

Further, under a state of being brought into contact with the contact portions 10bE to 10bJ, the noise suppression member 20 is grounded to the metal GND plate (grounded member) 70.

In this manner, even when antenna cables having different distances from end portions to contact portions are included, electrical conduction with the outer conductors 13 of the plurality of antenna cables 10E to 10J can be achieved by using the one noise suppression member 20 with a simpler configuration.

As described above, in the present embodiment, the cable arrangement is changed. With this, in a case in which different noises are generated in a plurality of antenna cables, even when the plurality of antenna cables are grounded at the same position, a noise suppression effect can be exerted for each noise.

Fourth Embodiment

An antenna cable noise suppression structure 1 according to the present embodiment is basically configured substantially the same as the antenna cable noise suppression structure 1 illustrated in the first embodiment described above.

Figure 10:
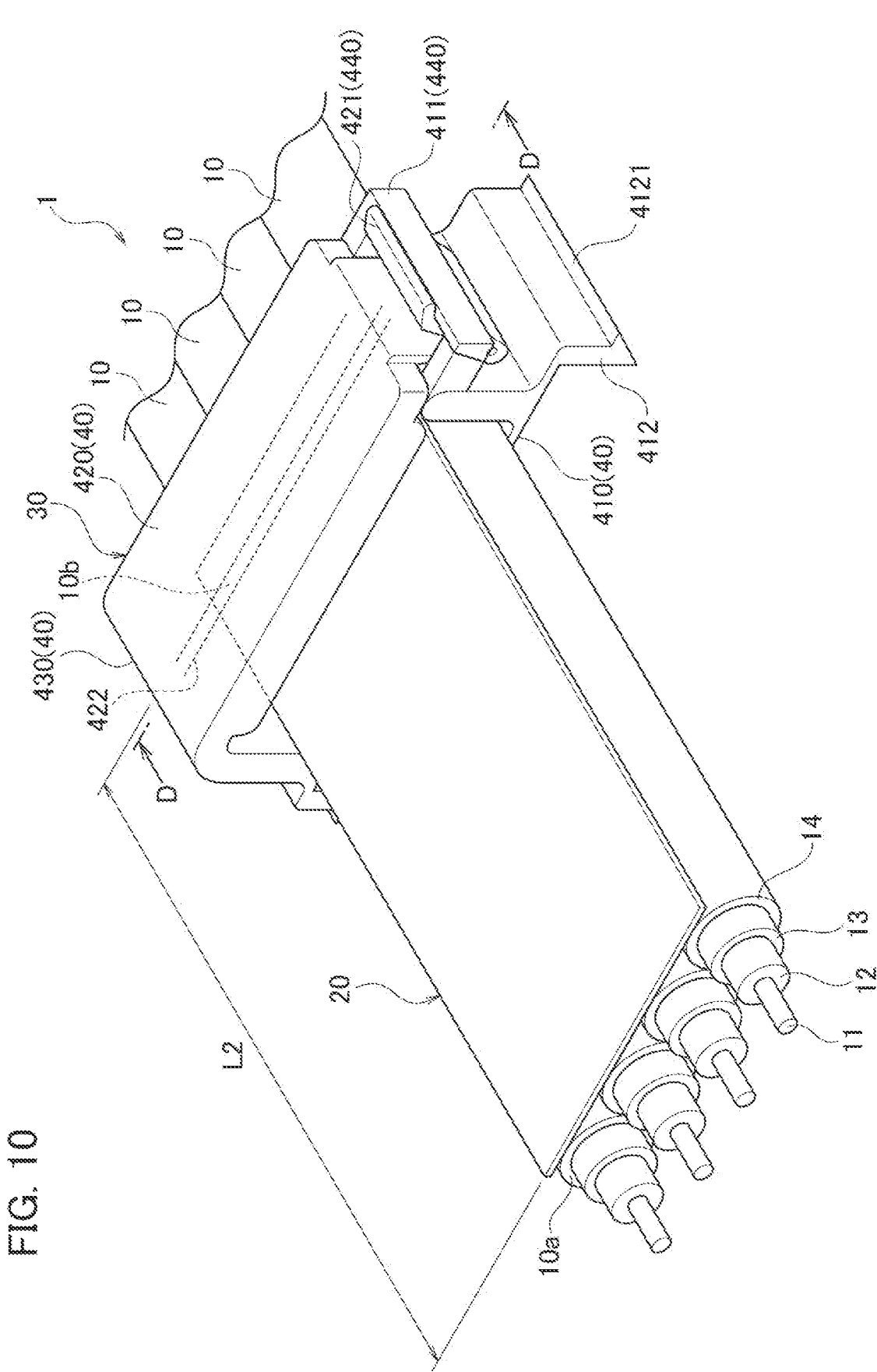
FIG. 10 is a perspective view illustrating a state in which a plurality of antenna cables are bundled by using an example of a clamping member according to a fourth embodiment.
Figure 11:
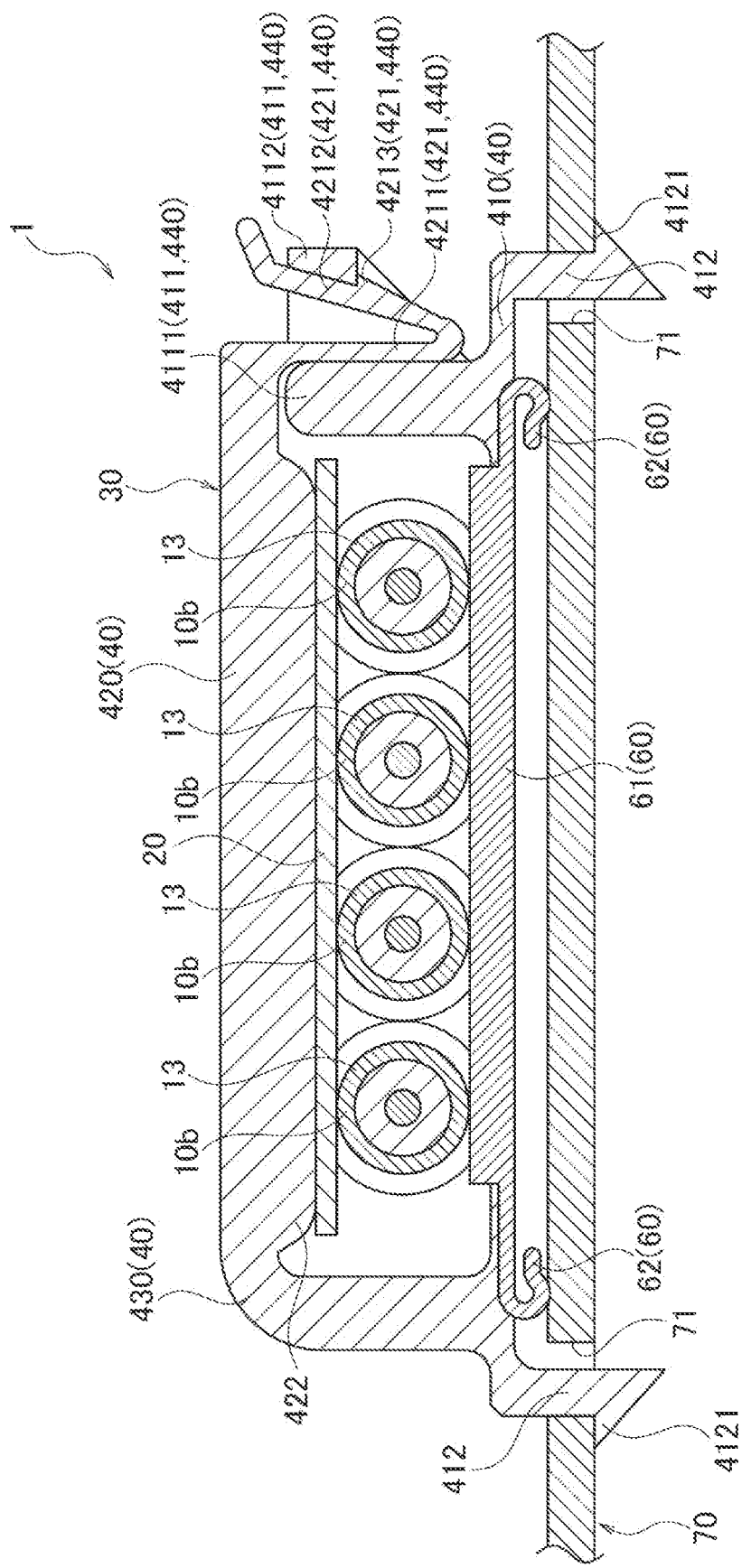
FIG. 11 is a cross-sectional view taken along the line D-D in FIG. 10, illustrating an example of an antenna cable noise suppression structure according to the fourth embodiment.

Specifically, as illustrated in FIG. 10 and FIG. 11, the antenna cable noise suppression structure 1 according to the present embodiment also includes four (plurality of) antenna cables. Further, the antenna cable noise suppression structure 1 includes the noise suppression member 20 that has electrical conductivity and are electrically connected to each of the outer conductors 13 of the four (two or more) antenna cables.

Further, the noise suppression member 20 is electrically connected to the outer conductor 13 of each of the antenna cables at the position at which a distance L2 from the end of each of the antenna cables is equal to or less than one quarter of the wavelength $\lambda$ in each of the antenna cables.

Further, in the present embodiment, the noise suppression member 20 and the outer conductor 13 that is electrically connected to the noise suppression member 20 are also grounded to the GND plate (grounded portion) 70.

Specifically, in the antenna cable noise suppression structure 1 according to the present embodiment, all the outer conductors 13 of the four (plurality of) antenna cables are also electrically connected to the noise suppression member 20 at the position equal to or less than $\lambda/4$ of a noise frequency to be suppressed. Moreover, all the outer conductors 13 of the four (plurality of) antenna cables and the noise suppression member 20 are grounded to the GND plate (grounded portion) 70 via the grounding portions 62 at the position equal to or less than $\lambda/4$ of a noise frequency to be suppressed.

Further, in the present embodiment, the four antenna cables 10 are also connected to the antennas that are used in substantially the same frequency band.

Here, in the present embodiment, the noise suppression member 20 has a substantially rectangular plate-like shape, and is provided as a separate body from the clamping member 30. Further, the noise suppression member 20 having a substantially rectangular plate-like shape is arranged so as to cover the four antenna cables 10 from above. In this state, a range of the four antenna cables 10 in which the length of the cable axis direction is equal to or less than $\lambda/4$, in other words, a range of the four antenna cables 10 from the end portions 10a to the contact portions 10b is covered with the noise suppression member 20 having a substantially rectangular plate-like shape.

Further, the portion of the noise suppression member 20 that corresponds to the contact portions 10b is clamped by the clamping member 30.

In the present embodiment, the outer insulation layer 14 corresponding to the predetermined portion of each of the antenna cables 10 is also removed in advance, and the outer conductor 13 is also exposed in this portion. Further, the noise suppression member 20 is brought into contact with the outer conductor 13 that is exposed. Specifically, when the clamping main body 40 clamps the four antenna cables 10, pressing is performed while the noise suppression member 20 is pressed downward by the cable retainer 422 and is brought into contact with the outer conductor 13. In this manner, under a state in which the clamping main body 40 clamps the four antenna cables 10, the noise suppression member 20 is brought into contact with the outer conductor 13. In this state, the upper end of the main body portion 61 is brought into contact with the contact portion 10b of each of the antenna cables 10.

In this manner, the noise suppression member 20 is electrically connected to the grounding portions 62 via the outer conductors 13 of the four antenna cables 10 and the main body portion 61.

As described above, in the present embodiment, the antenna cable noise suppression structure 1 includes an electric conductor (a shield member: the noise suppression member 20) that is capable of covering the length from the end portion 10a of the antenna cable 10, which is equal to or more than $\lambda/4$, and the plurality of antenna cables 10. Further, the electric conductor (the shield member: the noise suppression member 20) and the outer conductor 13 of the antenna cable 10 are electrically conducted with each other at the position equal to or less than $\lambda/4$ in the plurality of antenna cables 10.

With this, generation of a noise in each of the antenna cables 10 can also be suppressed.

Note that, in the present embodiment, the noise suppression member 20 and the grounding portion 62 are formed as separate members. In this manner, the noise suppression member 20 is provided separately from the grounding portion 62, and thus generation of a noise in each of the antenna cables 10 can be suppressed more easily and securely.

Fifth Embodiment

An antenna cable noise suppression structure 1 according to the present embodiment is basically configured substantially the same as the antenna cable noise suppression structure 1 illustrated in the first embodiment described above.

Figure 12:
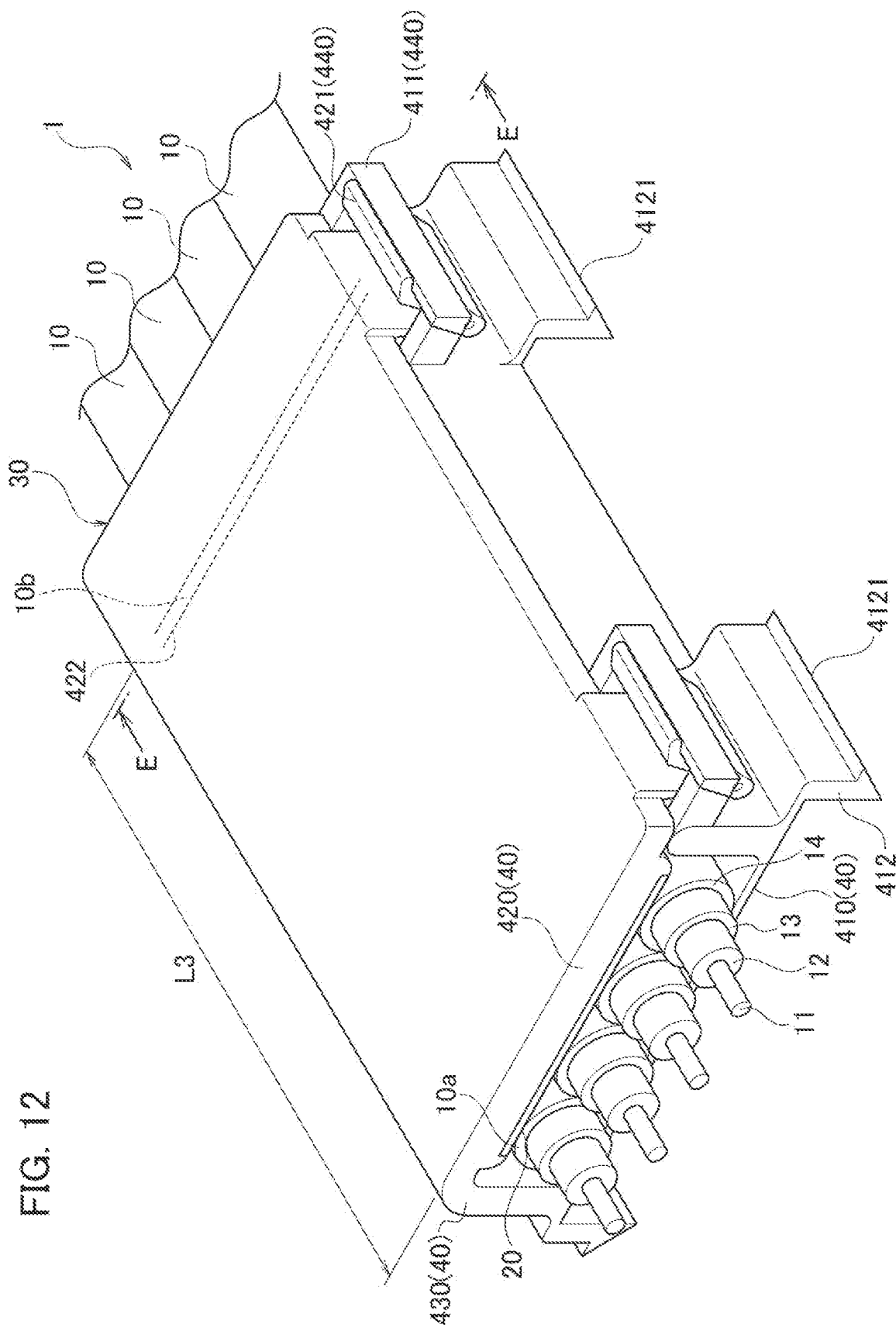
FIG. 12 is a perspective view illustrating a state in which a plurality of antenna cables are bundles by using an example of a clamping member according to a fifth embodiment.
Figure 13:
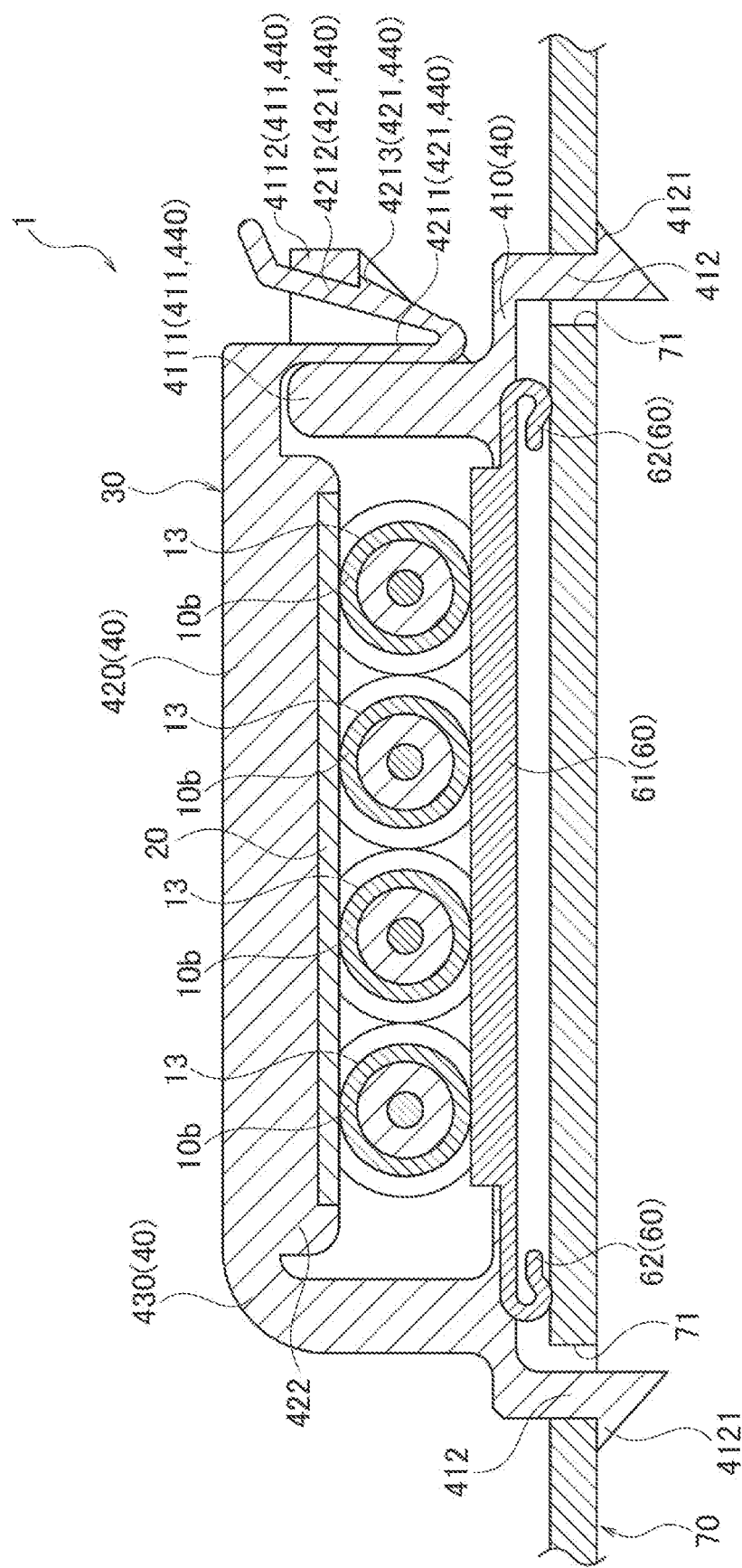
FIG. 13 is a cross-sectional view taken along the line E-E in FIG. 12, illustrating an example of an antenna cable noise suppression structure according to the fifth embodiment.

Specifically, as illustrated in FIG. 12 and FIG. 13, the antenna cable noise suppression structure 1 according to the present embodiment also includes four (plurality of) antenna cables. Further, the antenna cable noise suppression structure 1 includes the noise suppression member 20 that has electrical conductivity and are electrically connected to each of the outer conductors 13 of the four (two or more) antenna cables.

Further, the noise suppression member 20 is electrically connected to the outer conductor 13 of each of the antenna cables at the position at which a distance L3 from the end of each of the antenna cables is equal to or less than one quarter of the wavelength $\lambda$ in each of the antenna cables.

Further, in the present embodiment, the noise suppression member 20 and the outer conductor 13 that is electrically connected to the noise suppression member 20 are also grounded to the GND plate (grounded portion) 70.

Specifically, in the antenna cable noise suppression structure 1 according to the present embodiment, all the outer conductors 13 of the four (plurality of) antenna cables are also electrically connected to the noise suppression member 20 at the position equal to or less than $\lambda/4$ of a noise frequency to be suppressed. Moreover, all the outer conductors 13 of the four (plurality of) antenna cables and the noise suppression member 20 are grounded to the GND plate (grounded portion) 70 via the grounding portions 62 at the position equal to or less than $\lambda/4$ of a noise frequency to be suppressed.

Further, in the present embodiment, the four antenna cables 10 are also connected to the antennas that are used in substantially the same frequency band.

Here, in the present embodiment, the noise suppression member 20 has a substantially rectangular plate-like shape, and is formed integrally with the clamping member 30. The clamping member 30 of this type may be formed by subjecting the clamping main body 40 and the noise suppression member 20 to insert molding, for example.

Further, under a state in which the clamping main body 40 clamps the four antenna cables 10, the noise suppression member 20 having a substantially rectangular plate-like shape covers the four antenna cables 10 from above. In this state, the range of the four antenna cables 10 in which the length of the cable axis direction is equal to or less than $\lambda/4$, in other words, the range of the four antenna cables 10 from the end portions 10a to the contact portions 10b is clamped by the clamping member 30.

In the present embodiment, the outer insulation layer 14 corresponding to the predetermined portion of each of the antenna cables 10 is also removed in advance, and the outer conductor 13 is also exposed in this portion. Further, the noise suppression member 20 is brought into contact with the outer conductor 13 that is exposed. Specifically, when the clamping main body 40 clamps the four antenna cables 10, the noise suppression member 20 provided to the cable retainer 422 presses the outer conductor 13 so that pressing is performed under a state in which the noise suppression member 20 is brought into contact with the outer conductor 13. In this manner, under a state in which the clamping main body 40 clamps the four antenna cables 10, the noise suppression member 20 is brought into contact with the outer conductor 13. In this state, the upper end of the main body portion 61 is brought into contact with the contact portion 10b of each of the antenna cables 10.

In this manner, the noise suppression member 20 is electrically connected to the grounding portions 62 via the outer conductors 13 of the four antenna cables 10 and the main body portion 61.

As described above, in the present embodiment, the electric conductor (the shield member: the noise suppression member 20) that is capable of covering the length from the end portion 10a of the antenna cable 10, which is equal to or more than $\lambda/4$, and the plurality of antenna cables 10 is integrally formed with the clamping member 30. Further, the electric conductor (the shield member: the noise suppression member 20) and the outer conductor 13 of the antenna cable 10 are electrically conducted with each other at the position equal to or less than $\lambda/4$ in the plurality of antenna cables 10.

With this, generation of a noise in each of the antenna cables 10 can also be suppressed.

Sixth Embodiment

An antenna cable noise suppression structure 1 according to the present embodiment is basically configured substantially the same as the antenna cable noise suppression structure 1 illustrated in the fourth embodiment described above.

Figure 14:
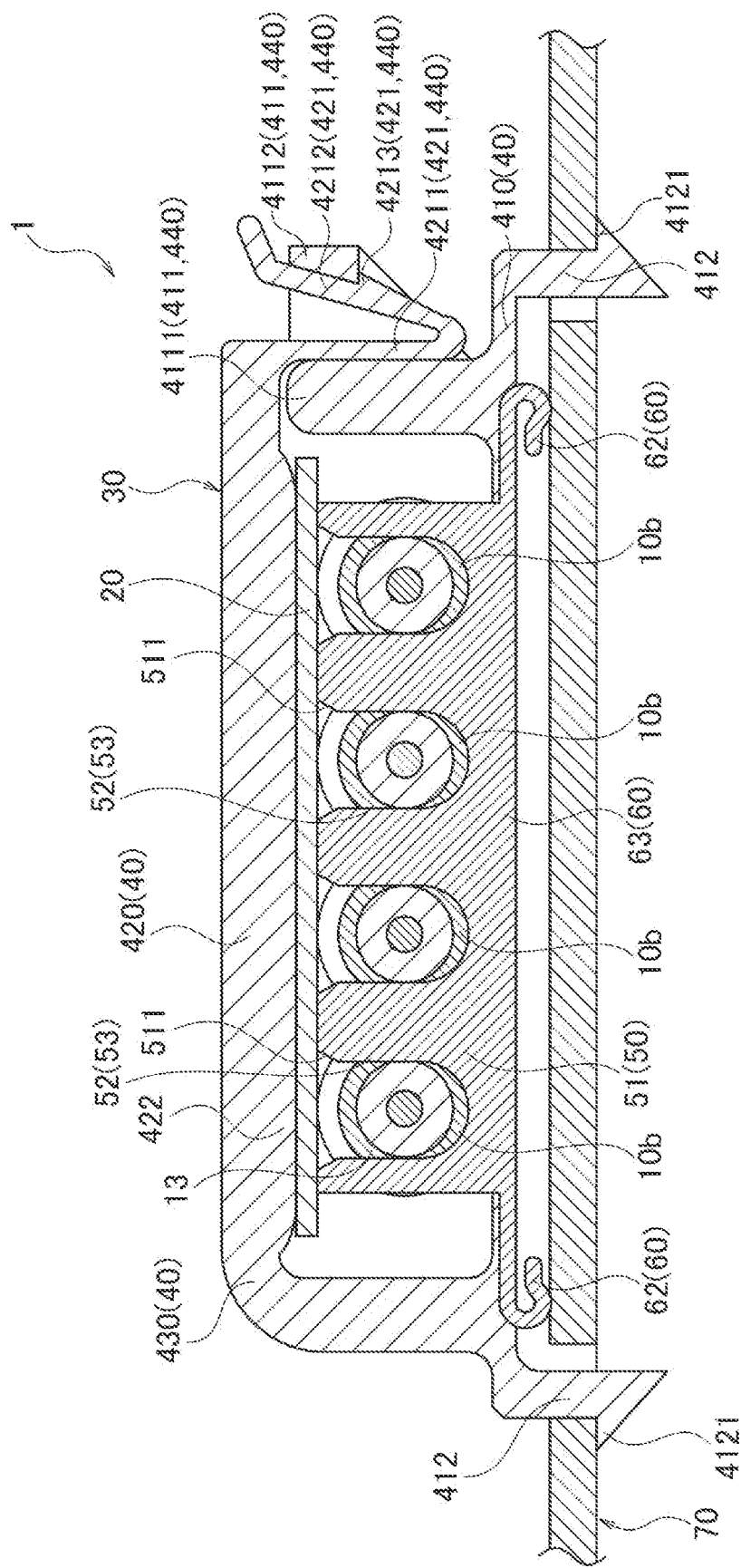
FIG. 14 is a cross-sectional view taken along the line D-D in FIG. 10, illustrating an example of an antenna cable noise suppression structure according to a sixth embodiment.

Specifically, as illustrated in FIG. 14, the antenna cable noise suppression structure 1 according to the present embodiment also includes four (plurality of) antenna cables. Further, the antenna cable noise suppression structure 1 includes the noise suppression member 20 that has electrical conductivity and are electrically connected to each of the outer conductors 13 of the four (two or more) antenna cables.

Further, the noise suppression member 20 is electrically connected to the outer conductor 13 of each of the antenna cables at the position at which the distance L2 from the end of each of the antenna cables is equal to or less than one quarter of the wavelength $\lambda$ in each of the antenna cables.

Further, in the present embodiment, the noise suppression member 20 and the outer conductor 13 that is electrically connected to the noise suppression member 20 are also grounded to the GND plate (grounded portion) 70.

Specifically, in the antenna cable noise suppression structure 1 according to the present embodiment, all the outer conductors 13 of the four (plurality of) antenna cables are also electrically connected to the noise suppression member 20 at the position equal to or less than $\lambda/4$ of a noise frequency to be suppressed. Moreover, all the outer conductors 13 of the four (plurality of) antenna cables and the noise suppression member 20 are grounded to the GND plate (grounded portion) 70 via the grounding portions 62 at the position equal to or less than $\lambda/4$ of a noise frequency to be suppressed.

Further, in the present embodiment, the four antenna cables 10 are also connected to the antennas that are used in substantially the same frequency band.

Further, in the present embodiment, the noise suppression member 20 has also a substantially rectangular plate-like shape, and is also provided as a separate body from the clamping member 30. Further, the noise suppression member 20 having a substantially rectangular plate-like shape is arranged so as to cover the four antenna cables 10 from above. In this state, a range of the four antenna cables 10 in which the length of the cable axis direction is equal to or less than $\lambda/4$, in other words, a range of the four antenna cables 10 from the end portions 10a to the contact portions 10b is covered with the noise suppression member 20 having a substantially rectangular plate-like shape.

Further, the portion of the noise suppression member 20 that corresponds to the contact portions 10b is clamped by the clamping member 30.

Here, in the present embodiment, the clamping member 30 includes a pressure contact blade 53 that is fixed to the clamping main body 40. Further, when the antenna cable 10 including the outer conductor 13 that is electrically connected to the noise suppression member 20 is collectively clamped by the clamping main body 40, the pressure contact blade 53 is electrically connected to the outer conductor 13 of each of the antenna cables 10.

Further, the pressure contact blade 53 and the grounding portion 62 are electrically connected to each other. Specifically, In the present embodiment, the clamping member 30 includes four (plurality of) cable holders 50. Further, when the clamping main body 40 clamps the plurality of antenna cables 10, the one antenna cable 10 is temporarily held by each of the cable holders 50. In the present embodiment, the four (plurality of) cable holders 50 are formed of a material having electrical conductivity such as metal, and are fixed to the first clamping portion 410 under a state in which the four (plurality of) cable holders 50 are separated from each other.

Further, the four (plurality of) cable holders 50 include main body portions 51, respectively, and a cable holding groove 511 that is opened upward is formed in each of the main body portions 51. Further, when the antenna cable 10 is temporarily held by the cable holder 50, the antenna cable 10 is inserted into the cable holding groove 511.

Moreover, in the present embodiment, a blade portion 52 is formed at the peripheral edge portion of the cable holding groove 511 of each of the main body portions 51. Further, when the clamping main body 40 clamps the plurality of antenna cables 10, the blade portion 52 passes through the outer insulation layer 14 to contact with the outer conductor 13.

As described above, in the present embodiment, the blade portion 52 formed in each of the cable holders 50 functions as the pressure contact blade 53.

Moreover, the clamping member 30 includes the grounding portion 62 that is fixed to the clamping main body 40 under a state in which the grounding portion 62 is electrically connected to each of the blade portions 52 (the pressure contact blades 53). In the present embodiment, the grounding portion 62 is formed on the grounding jumper 60 formed of a material having electrical conductivity such as metal. Further, the grounding jumper 60 is fixed to the first clamping portion 410, and thus the grounding portion 62 is fixed to the first clamping portion 410.

In the present embodiment, the grounding jumper 60 includes a coupling portion 63 that extends elongatedly in the width direction and has an upper end to which the lower ends of the four (plurality of) cable holders 50 are continuously provided and the pair of grounding portions 62 that are formed on both the ends in the width direction of the lower end of the coupling portion 63. In other words, the four (plurality of) cable holders 50 and the one grounding jumper 60 are formed as one member having electrical conductivity. In this manner, all the blade portions 52 and all the grounding portions 62 are electrically connected to each other via the coupling portions, and all the antenna cables 10 are electrically connected to the grounding portion 62 via the blade portion 52.

Moreover, in the present embodiment, under a state in which the clamping main body 40 collectively clamps the antenna cable 10, the pressure contact blade 53 is brought into contact with the noise suppression member 20.

In this manner, when the clamping main body 40 clamps each of the antenna cables 10, the outer conductor 13 can be grounded to the GND plate (grounded portion) 70 without performing a work for exposing the outer conductor 13 in advance.

Seventh Embodiment

An antenna cable noise suppression structure 1 according to the present embodiment is basically configured substantially the same as the antenna cable noise suppression structure 1 illustrated in the fifth embodiment described above.

Figure 15:
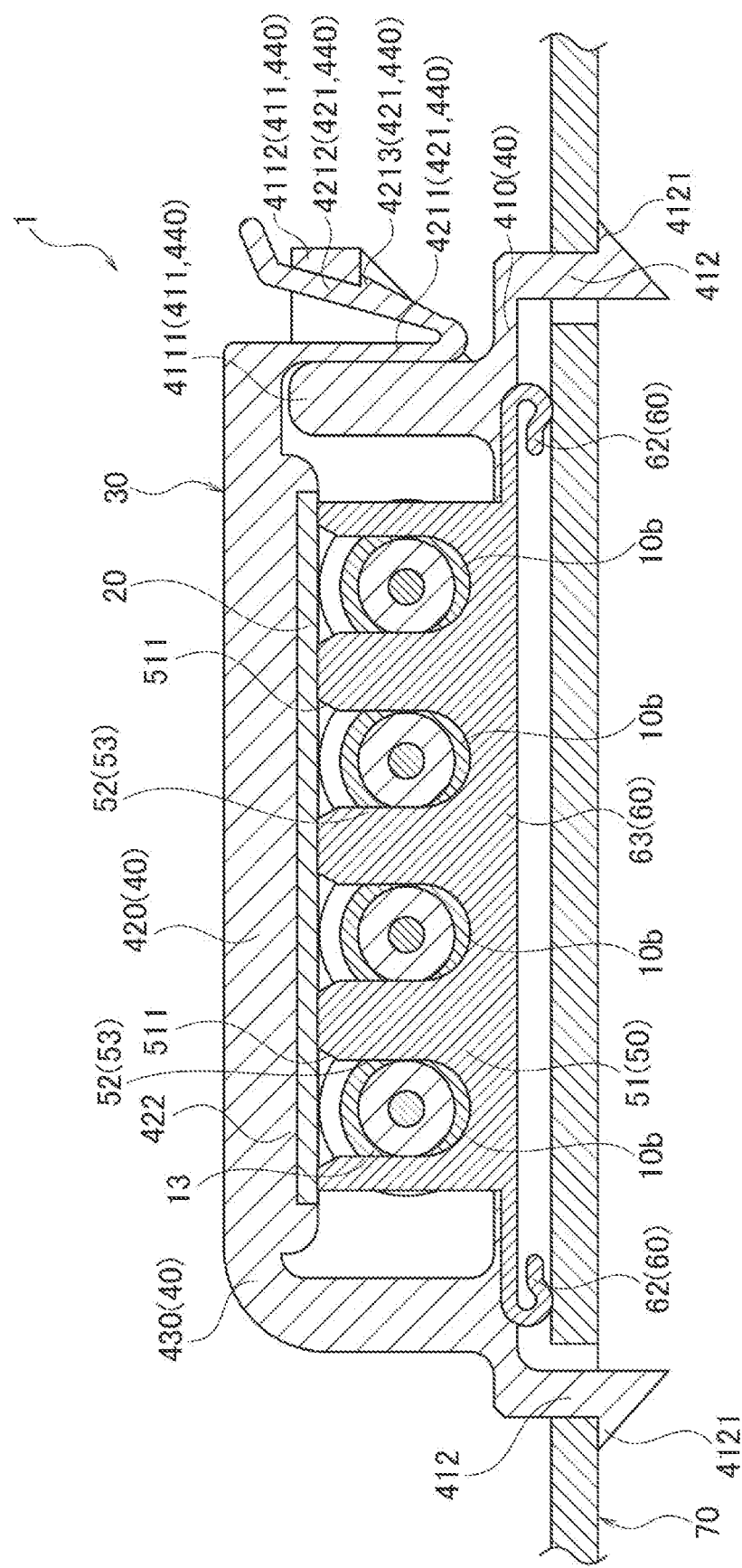
FIG. 15 is a cross-sectional view taken along the line E-E in FIG. 12, illustrating an example of an antenna cable noise suppression structure according to a seventh embodiment.

Specifically, as illustrated in FIG. 15, the antenna cable noise suppression structure 1 according to the present embodiment also includes four (plurality of) antenna cables. Further, the antenna cable noise suppression structure 1 includes the noise suppression member 20 that has electrical conductivity and are electrically connected to each of the outer conductors 13 of the four (two or more) antenna cables.

Further, the noise suppression member 20 is electrically connected to the outer conductor 13 of each of the antenna cables at the position at which the distance L3 from the end of each of the antenna cables is equal to or less than one quarter of the wavelength $\lambda$ in each of the antenna cables.

Further, in the present embodiment, the noise suppression member 20 and the outer conductor 13 that is electrically connected to the noise suppression member 20 are also grounded to the GND plate (grounded portion) 70.

Specifically, in the antenna cable noise suppression structure 1 according to the present embodiment, all the outer conductors 13 of the four (plurality of) antenna cables are also electrically connected to the noise suppression member 20 at the position equal to or less than $\lambda/4$ of a noise frequency to be suppressed. Moreover, all the outer conductors 13 of the four (plurality of) antenna cables and the noise suppression member 20 are grounded to the GND plate (grounded portion) 70 via the grounding portions 62 at the position equal to or less than $\lambda/4$ of a noise frequency to be suppressed.

Further, in the present embodiment, the four antenna cables 10 are also connected to the antennas that are used in substantially the same frequency band.

Further, in the present embodiment, the noise suppression member 20 also has a substantially rectangular plate-like shape, and is also formed integrally with the clamping member 30. The clamping member 30 of this type may be formed by subjecting the clamping main body 40 and the noise suppression member 20 to insert molding, for example.

Further, under a state in which the clamping main body 40 clamps the four antenna cables 10, the noise suppression member 20 having a substantially rectangular plate-like shape covers the four antenna cables 10 from above. In this state, the range of the four antenna cables 10 in which the length of the cable axis direction is equal to or less than $\lambda/4$, in other words, the range of the four antenna cables 10 from the end portions 10a to the contact portions 10b is clamped by the clamping member 30.

Here, similarly to the sixth embodiment described above, in the present embodiment, the clamping member 30 also includes the pressure contact blade 53 that is fixed to the clamping main body 40. Further, when the antenna cable 10 including the outer conductor 13 that is electrically connected to the noise suppression member 20 is collectively clamped by the clamping main body 40, the pressure contact blade 53 is electrically connected to the outer conductor 13 of each of the antenna cables 10.

Further, the pressure contact blade 53 and the grounding portion 62 are electrically connected to each other. Moreover, under a state in which the clamping main body 40 collectively clamps the antenna cable 10, the pressure contact blade 53 is brought into contact with the noise suppression member 20.

In this manner, when the clamping main body 40 clamps each of the antenna cables 10, the outer conductor 13 can be grounded to the GND plate (grounded portion) 70 without performing a work for exposing the outer conductor 13 in advance.

Eighth Embodiment

An antenna cable noise suppression structure 1 according to the present embodiment is basically configured substantially the same as the antenna cable noise suppression structure 1 illustrated in the sixth embodiment described above.

Figure 16:
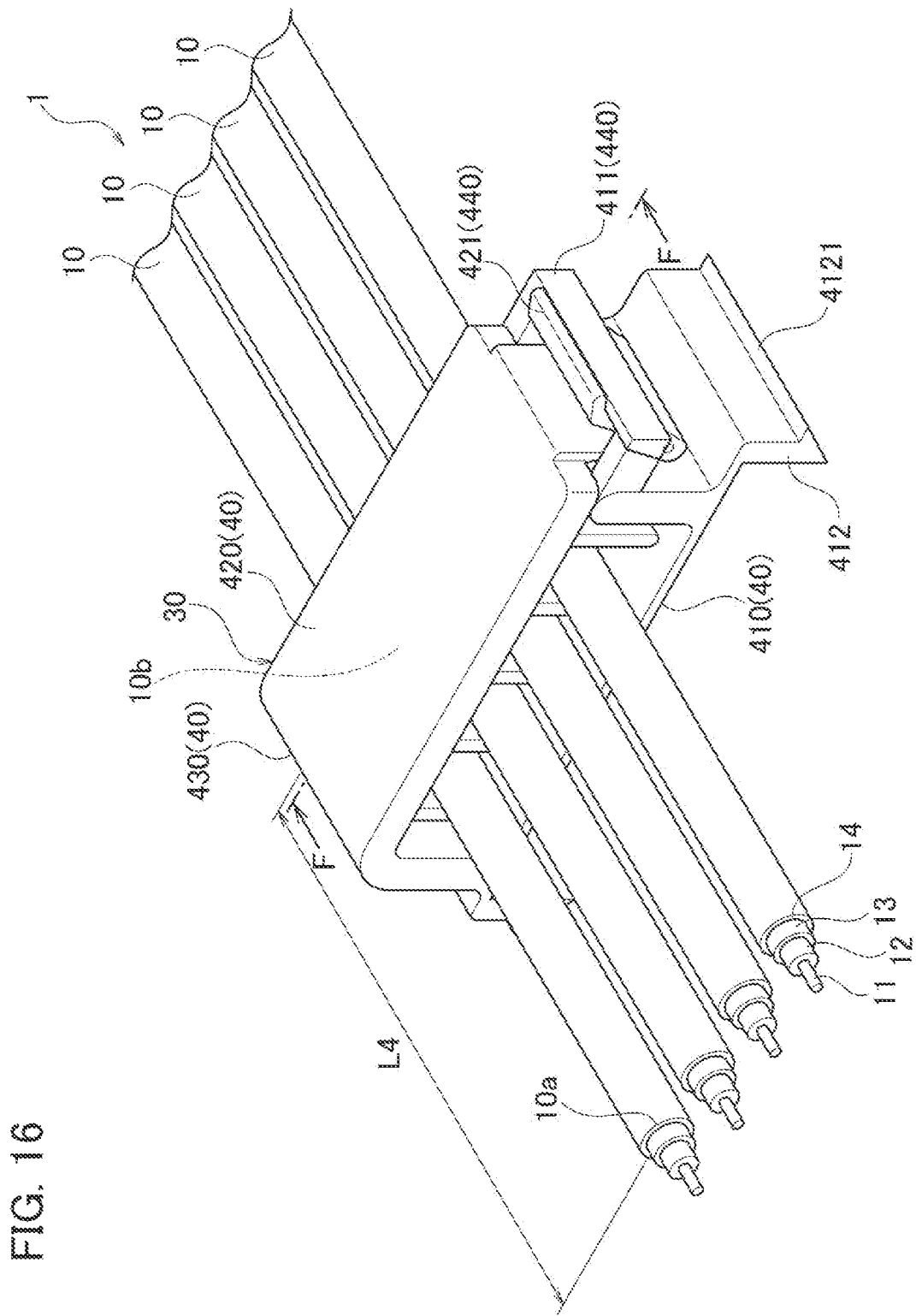
FIG. 16 is a perspective view illustrating a state in which a plurality of antenna cables are bundled by using an example of a clamping member according to an eighth embodiment.
Figure 17:
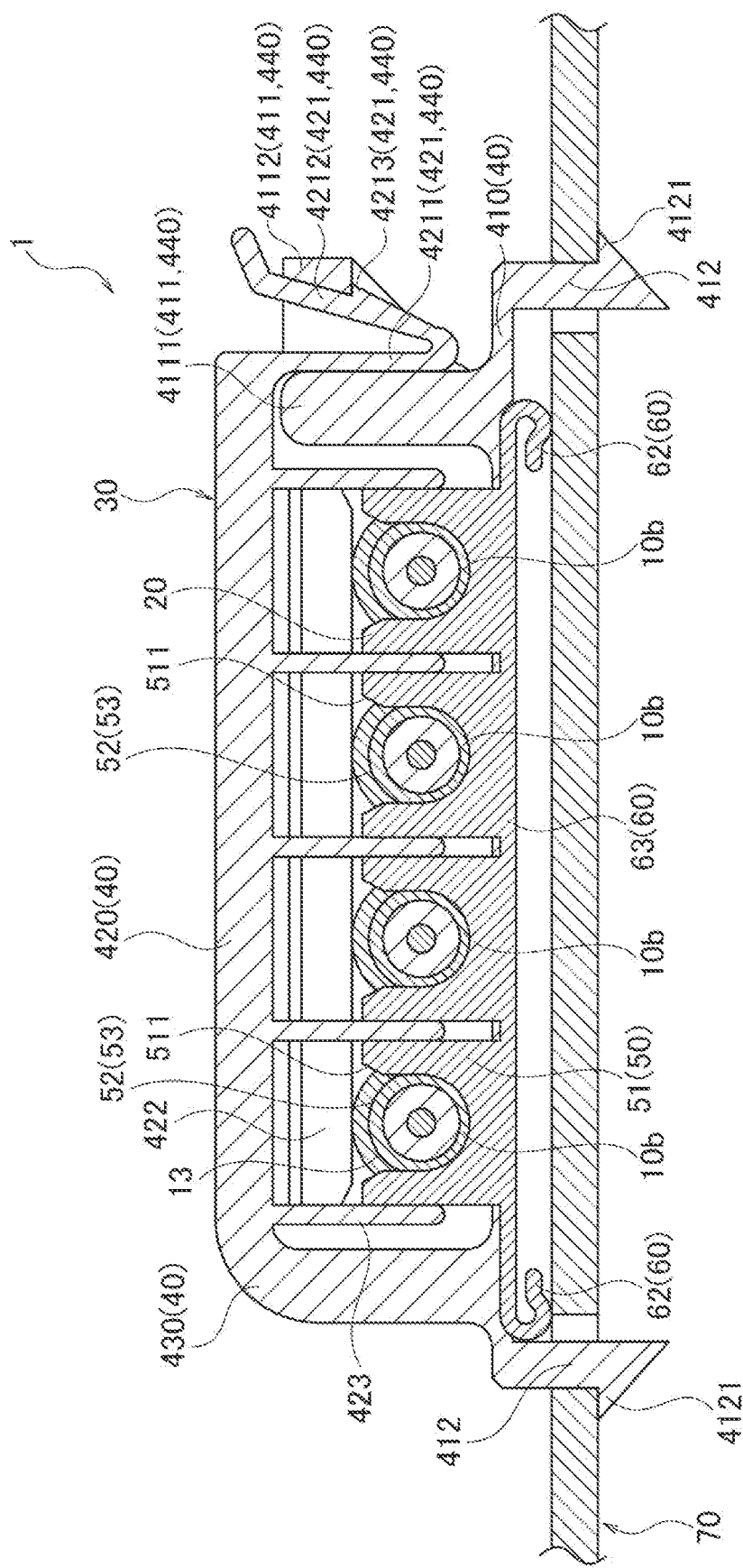
FIG. 17 is a cross-sectional view taken along the line F-F in FIG. 16, illustrating an example of an antenna cable noise suppression structure according to the eighth embodiment.

Specifically, as illustrated in FIG. 16 and FIG. 17, the antenna cable noise suppression structure 1 according to the present embodiment also includes four (plurality of) antenna cables. The four antenna cables 10 are respectively connected to the antennas that are used in substantially the same frequency band.

Further, in the present embodiment, the clamping member 30 also includes the pressure contact blade 53 that is fixed to the clamping main body 40 and can be electrically connected to the outer conductor 13 of the antenna cable 10.

Specifically, the clamping member 30 includes the four (plurality of) cable holders 50 so that the one antenna cable 10 is temporarily held by each of the cable holders 50 when the clamping main body 40 clamps the plurality of antenna cables 10. In the present embodiment, the four (plurality of) cable holders 50 are formed of a material having electrical conductivity such as metal, and are fixed to the first clamping portion 410 under a state in which the four (plurality of) cable holders 50 are separated from each other.

Further, the four (plurality of) cable holders 50 include the main body portions 51, respectively, and the cable holding groove 511 that is opened upward is formed in each of the main body portions 51. Further, when the antenna cable 10 is temporarily held by the cable holder 50, the antenna cable 10 is inserted into the cable holding groove 511.

Moreover, in the present embodiment, the blade portion 52 is formed at the peripheral edge portion of the cable holding groove 511 of each of the main body portions 51. Further, when the clamping main body 40 clamps the plurality of antenna cables 10, the blade portion 52 passes through the outer insulation layer 14 to contact with the outer conductor 13.

As described above, in the present embodiment, the blade portion 52 formed in each of the cable holders 50 functions as the pressure contact blade 53.

Moreover, the clamping member 30 includes the grounding portion 62 that is fixed to the clamping main body 40 under a state in which the grounding portion 62 is electrically connected to each of the blade portions 52 (the pressure contact blades 53). In the present embodiment, the grounding portion 62 is formed on the grounding jumper 60 formed of a material having electrical conductivity such as metal. Further, the grounding jumper 60 is fixed to the first clamping portion 410, and thus the grounding portion 62 is fixed to the first clamping portion 410.

In the present embodiment, the grounding jumper 60 includes the coupling portion 63 that extends elongatedly in the width direction and has the upper end to which the lower ends of the four (plurality of) cable holders 50 are continuously provided and the pair of grounding portions 62 that are formed on both the ends in the width direction of the lower end of the coupling portion 63. In other words, the four (plurality of) cable holders 50 and the one grounding jumper 60 are formed as one member having electrical conductivity. In this manner, all the blade portions 52 and all the grounding portions 62 are electrically connected to each other via the coupling portion 63, and all the antenna cables 10 are electrically connected to the grounding portion 62 via each of the blade portions 52.

Note that, in the present embodiment, under a state in which the grounding portion 62 is exposed downward, the grounding jumper 60 is fixed to the first clamping portion 410. Such a configuration may be formed by insert molding, for example.

Further, as illustrated in FIG. 17, the grounding portion 62 that is exposed downward is brought into contact with the GND plate (grounded portion) 70, and thus the outer conductors 13 of all the antenna cables 10 clamped by the clamping main body 40 are grounded to the GND plate (grounded portion) 70.

Moreover, in the present embodiment, at the lower end of the second clamping portion 420, a partition wall 423 that partitions the plurality of antenna cables 10 from each other is formed. Further, the partition wall 423 is provided, and thus the partition wall 423 can suppress movement of the antenna cable 10 in the horizontal direction (the width direction) when the clamping main body 40 clamps the plurality of antenna cables 10. In other words, when the clamping main body 40 clamps the plurality of antenna cables 10, the antenna cable 10 is guided by the partition wall 423, and is pressed downward by the cable retainer 422.

Here, in the present embodiment, all the antenna cables 10 are electrically connected to the grounding portion 62 via each of the blade portions 52 at the position at which a distance L4 from the end portion of each of the antenna cables is equal to or less than one quarter of the wavelength $\lambda$ in each of the antenna cables. Further, the outer conductors 13 of all the antenna cables 10 clamped by the clamping main body 40 are grounded to the GND plate (grounded portion) 70 at the position at which the distance L4 from the end portion of each of the antenna cables is equal to or less than one quarter of the wavelength $\lambda$ in each of the antenna cables.

In this manner, generation of a noise in a plurality of antenna cables can be suppressed simultaneously by the one noise suppression member 20. As described above, in the present embodiment, the cable holder 50 including the blade portion 52 (the pressure contact blade 53) and the grounding jumper 60 including the grounding portion 62 function as the noise suppression member 20.

Therefore, the antenna cable noise suppression structure 1 according to the present embodiment also includes the noise suppression member 20 that has electrical conductivity and is electrically connected to each of the outer conductors 13 of the four (two or more) antenna cables.

Further, the noise suppression member 20 is electrically connected to the outer conductor 13 of each of the antenna cables at the position at which the distance L4 from the end of each of the antenna cables is equal to or less than one quarter of the wavelength $\lambda$ in each of the antenna cables.

Note that a cable around which the noise suppression member 20 is wound in the periphery of the outer insulation layer 14 of the one antenna cable 10 may be used in place of the antenna cable 10. The noise suppression member 20 is also electrically connected to the outer conductor 13 at the position equal to or less than $\lambda/4$ of a noise frequency to be suppressed.

Actions and Effects

Characteristic configurations of the antenna cable noise suppression structure illustrated in each of the embodiments and the modification examples thereof that are described above and effects exerted therefrom are described below.

the antenna cable noise suppression structure 1 illustrated in each of the embodiments and the modification examples thereof includes the plurality of antenna cables 10, 10A to 10J. Further, the antenna cable noise suppression structure 1 includes the noise suppression member 20 that has electrical conductivity and is electrically connected to each of the outer conductors 13 of the two or more antenna cables 10, 10A to 10J.

Further, the noise suppression member 20 is electrically connected to the outer conductors 13 of the antenna cables at the positions at which the distances L1 to L4 and LE to LJ from the end portions 10a and 10aE to 10aJ of the antenna cables are equal to or less than one quarter of the wavelength $\lambda$ in the antenna cables. Here, the wavelength $\lambda$ is calculated based on the frequency f of the signal transmitted by each of the antenna cables.

Moreover, the noise suppression member 20 and the outer conductor 13 that is electrically connected to the noise suppression member 20 are grounded to the GND plate (grounded portion) 70.

In this manner, in the antenna cable noise suppression structure 1 that is illustrated in each of the embodiments and the modification example thereof, the noise suppression member 20 is electrically connected to the outer conductors 13 at the position at which the distance from the end portions of the two or more antenna cables is equal to or less than one quarter of the wavelength λ. With this, generation of a noise in a plurality of antenna cables can be suppressed simultaneously by the one noise suppression member 20. Thus, even when a plurality of antenna cables are used, generation of a noise in each antenna cable can be suppressed with a minimal effort.

Moreover, when the noise suppression member 20 and the outer conductor 13 are grounded to the GND plate (grounded portion) 70, the ground potential of the outer conductor 13 that is electrically connected to the noise suppression member 20 can be stabilized more. Thus, generation of a noise in each antenna cable can be suppressed more securely.

In this manner, with the antenna cable noise suppression structure 1 illustrated in each of the embodiments and the modification examples thereof, even when a plurality of antenna cables are used, generation of a noise in each antenna cable can be suppressed more easily and securely.

Further, when generation of a noise in each antenna cable can be suppressed, the antenna characteristics of the antenna to which each antenna cable is connected can be stabilized more.

Moreover, with the antenna cable noise suppression structure 1 illustrated in each of the embodiments and the modification examples thereof, the number of materials and components can be reduced, and reduction in weight of the device and reduction in processing cost can also be achieved.

Note that the antenna cable noise suppression structure 1 illustrated in each of the embodiments and the modification examples thereof is applicable to a mode in which a plurality of antennas operating in closely spaced frequency bands are implemented. Further, it is also applicable to a composite antenna mode in which a plurality of antennas for MIMO or diversity function, all receiving the same frequency, are implemented.

Further, in the antenna cables 10A to 10D including the outer conductors 13 electrically connected to the noise suppression member 20, the specific dielectric constants ε of the outer insulation layers 14A to 14D provided to the peripheries of the outer conductors 13 are different from each other. In this state, it is preferred that the specific dielectric constants ε of the outer insulation layers 14A to 14D be different from each other according to the frequency f of the signal transmitted by each of the antenna cables 10A to 10D.

With this, the distance L1 from the end portions 10aA to 10aD of the antenna cables 10A to 10D to the outer conductors 13 electrically connected to the noise suppression member 20 can be the same length. As a result, even when antenna cables with different frequencies f of signals to be transmitted are present, electrical conduction with the outer conductors 13 of the plurality of antenna cables 10A to 10D can be achieved by using the one noise suppression member 20 with a simpler configuration.

Further, the antenna cables 10, 10A to 10J may be arranged so that the portions from the end portions 10a, 10aA to 10aJ to the outer conductors 13 that are brought into contact with the noise suppression member 20 are positioned on the inner side of the region R1 defining the noise suppression member 20 in a plane view. Note that the antenna cables 10, 10A to 10J are antenna cables including the outer conductors 13 electrically connected to the noise suppression member 20.

With this, even when antenna cables with different frequencies f of signals to be transmitted are present, electrical conduction with the outer conductors 13 of the plurality of antenna cables 10, 10A to 10J can also be achieved by using the one noise suppression member 20 with a simpler configuration.

Further, the antenna cable noise suppression structure 1 may further include the clamping member 30 capable of collectively clamping the plurality of antenna cables 10, 10A to 10J. Further, the clamping member 30 may include the clamping main body 40 that collectively clamps the antenna cables 10, 10A to 10D including the outer conductors 13 that are electrically connected to the noise suppression member 20, and the grounding portion 62 that is grounded to the GND plate (grounded portion) 70. Further, the noise suppression member 20 and the outer conductor 13 that is electrically connected to the noise suppression member 20 may be electrically connected to the grounding portion 62.

With this, the outer conductors 13 of the plurality of antenna cables 10,10A to 10D can be electrically connected to the grounding portion 62 at the same time. Thus, the outer conductors 13 of the plurality of antenna cables 10,10A to 10D can be collectively grounded to the GND plate (grounded portion) 70 simply by grounding the grounding portion 62 to the GND plate (grounded portion) 70. Therefore, the outer conductors 13 of the plurality of antenna cables 10,10A to 10D can be grounded to the GND plate (grounded portion) 70 more easily.

Further, the clamping member 30 may include the pressure contact blade 53 that is fixed to the clamping main body 40. Under a state in which the clamping main body 40 collectively clamps the antenna cables 10, 10A to 10J including the outer conductors 13 that are electrically connected to the noise suppression member 20, the pressure contact blade 53 is electrically connected to the outer conductor 13 of each of the antenna cables 10, 10A to 10J. Further, the pressure contact blade 53 and the grounding portion 62 may be electrically connected to each other.

With this, when the clamping main body 40 clamps each of the antenna cables 10, 10A to 10J, the outer conductor 13 can be grounded to the GND plate (grounded portion) 70 without performing a work for exposing the outer conductor 13 in advance. Thus, a work for grounding the outer conductor 13 to the GND plate (grounded portion) 70 can be performed more easily.

Further, the noise suppression member 20 and the grounding portion 62 may be formed as separate members.

With this, the noise suppression member 20 is provided separately from the grounding portion 62, and hence generation of a noise in each antenna cable can be suppressed more easily and securely.

[Others]

The present embodiments are described above. However, the present embodiments are not limited thereto, and various modifications may be made within the gist of the present embodiments.

For example, a configuration may be obtained as appropriate by combining the configurations described in the respective embodiments and the modification examples thereof that are described above.

Further, in each of the embodiments and the modification examples thereof that are described above, the state in which the outer conductors 13 of all the antenna cables 10 used in the antenna cable noise suppression structure 1 are brought into contact with the noise suppression member 20 is illustrated. However, the configuration is not limited thereto. For example, when the four antenna cables 10 are included, the outer conductors 13 of the two or three antenna cables 10 may be brought into contact with the one noise suppression member 20. When the outer conductors 13 of the three antenna cables 10 are brought into contact, it is preferred that, as the remaining antenna cable, a cable around which the noise suppression member 20 is wound in the periphery of the outer insulation layer 14 of the antenna cable 10 be used. Further, when the outer conductors 13 of the two antenna cable 10 are brought into contact, the outer conductors 13 of the remaining two antenna cables 10 may be brought into contact with another noise suppression member 20 at the same time, or the noise suppression member 20 may be provided individually therefor.

Further, the position at which the noise suppression member 20 is brought into contact with the outer conductor 13 is not required to be calculated by the expression shown in each of the embodiments and the modification examples thereof that are described above, and may be any position as long as the position corresponds to the position equal to or less than $\lambda/4$ of a noise frequency to be suppressed.

Further, in each of the embodiments and the modification examples thereof that are described above, the clamping main body 40 formed of a synthetic resin is illustrated. However, the clamping main body 40 may be formed of metal, and the clamping main body 40 itself may have electrical conductivity.

Further, the number of antenna cables 10 that can be clamped by the clamping member 30 is not limited to four, and a clamping member capable of clamping two, three, five, or more antenna cables 10 at the same time may be achieved, for example.

Further, in each of the embodiments and the modification examples thereof that are described above, the state in which the antenna cable 10 is arranged on the GND plate 70 having electrical conductivity, but the antenna cable 10 may be arranged on a member without electrical conductivity such as a case. In this case, the noise suppression member 20 and the outer conductor 13 are grounded to another grounded member (for example, a ground pattern of a printed circuit board).

Further, in the fifth embodiment and the seventh embodiment described above, the state in which the noise suppression member 20 is insert-molded on the upper side of the clamping main body 40 is illustrated, but the noise suppression member 20 may be insert-molded on the lower side of the clamping main body 40. Further, the noise suppression member 20 may be insert-molded in the clamping main body 40 so as to surround the periphery of the antenna cable 10.

Further, in the sixth embodiment to the eighth embodiment described above, the state in which the cable holders 50 are formed individually is illustrated, but the plurality of antenna cables 10 may be temporarily held by the one cable holder 50.

Further, in the eighth embodiment and the modification example thereof that are described above, the state in which the partition wall 423 is provided to the second clamping portion 420 is illustrated, but the partition wall may be provided to the first clamping portion 410. Further, the partition wall may be a separate body from the first clamping portion 410 and the second clamping portion 420, or a configuration in which a partition wall is not provided may be adopted.

Further, specifications (shapes, sizes, layouts, and the like) of the antenna cables, the grounded portion, and the other detailed portions may be changed as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An antenna cable noise suppression structure, comprising:
   a plurality of antenna cables; and
   a noise suppression member having electrical conductivity and being electrically connected to each of outer conductors of the plurality of antenna cables, wherein
   the noise suppression member is wound around the plurality of antenna cables and has a length (L1) extending along a cable axis direction from an end portion of each antenna cable to a contact position at which the noise suppression member is electrically connected to an outer conductor of each antenna cable,
   wherein the length (L1) is equal to or less than one quarter of a wavelength calculated based on a frequency of a signal transmitted by each antenna cable, and
   the noise suppression member and the outer conductor of each antenna cable that is electrically connected to the noise suppression member are grounded to a grounded portion.

2. The antenna cable noise suppression structure according to claim 1, wherein
   an antenna cable including the outer conductor that is electrically connected to the noise suppression member has a specific dielectric constant of an outer insulation layer provided to a periphery of the outer conductor, the specific dielectric constant differing according to a frequency of a signal transmitted by each antenna cable.

3. The antenna cable noise suppression structure according to claim 1, wherein
   an antenna cable including the outer conductor that is electrically connected to the noise suppression member is arranged so that a part from the end to the outer conductor that is brought into contact with the noise suppression member is positioned on an inner side of a region defining the noise suppression member in a plane view.

4. The antenna cable noise suppression structure according to claim 1, further comprising:
   a clamp member capable of collectively clamping the plurality of antenna cables, wherein
   the clamp member includes:
      a clamp main body configured to collectively clamp an antenna cable including the outer conductor that is electrically connected to the noise suppression member; and
      a grounding portion being grounded to the grounded portion, and
   the noise suppression member and the outer conductor that is electrically connected to the noise suppression member are grounded to the grounding portion.

5. The antenna cable noise suppression structure according to claim 4, wherein
the clamp member includes a pressure contact blade that is fixed to the clamp main body and is electrically connected to an outer conductor of each antenna cable under a state in which an antenna cable including the outer conductor that is electrically connected to the noise suppression member is collectively clamped by the clamp main body, and
the pressure contact blade and the grounding portion are electrically connected to each other.

6. The antenna cable noise suppression structure according to claim 4, wherein
the noise suppression member and the grounding portion are formed by separate members.

* * * * *